(12) United States Patent
Park et al.

(10) Patent No.: US 9,621,899 B2
(45) Date of Patent: *Apr. 11, 2017

(54) METHODS AND APPARATUSES FOR ENCODING AND DECODING MODE INFORMATION

(75) Inventors: Sung-bum Park, Seongnam-si (KR); Jung-woo Kim, Seoul (KR); Dai-woong Choi, Seoul (KR); Jae-won Yoon, Seoul (KR); Jun-ho Cho, Siheung-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1382 days.

This patent is subject to a terminal disclaimer.

(21) Appl. No.: 12/884,676

(22) Filed: Sep. 17, 2010

(65) Prior Publication Data

US 2011/0064132 A1 Mar. 17, 2011

Related U.S. Application Data

(60) Provisional application No. 61/243,216, filed on Sep. 17, 2009, provisional application No. 61/243,218, (Continued)

(51) Int. Cl.
*H04N 19/132* (2014.01)
*H04N 19/46* (2014.01)
(Continued)

(52) U.S. Cl.
CPC ......... *H04N 19/132* (2014.11); *H04N 19/103* (2014.11); *H04N 19/174* (2014.11); (Continued)

(58) Field of Classification Search
CPC ...... H04N 19/103; H04N 19/13; H04N 19/46; H04N 19/132; H04N 19/174; H04N 19/176; H04N 19/34; H04N 19/60
(Continued)

(56) References Cited

U.S. PATENT DOCUMENTS 6,040,863 A 3/2000 Kato
7,903,873 B2 3/2011 Lu et al.
(Continued)

FOREIGN PATENT DOCUMENTS

CN 101321287 A 12/2008
CN 101415115 A 4/2009
(Continued)

OTHER PUBLICATIONS

International Search Report, dated May 13, 2011, issued in Application No. PCT/KR2010/006422.
(Continued)

*Primary Examiner* — Behrooz Senfi
(74) *Attorney, Agent, or Firm* — Sughrue Mion, PLLC

(57) ABSTRACT

Methods and apparatuses for encoding and decoding mode information of a block of an image. The method of decoding the mode information includes decoding information representing whether a current block is encoded in a first mode, and hierarchically decoding information representing an encoding mode of the current block from among a second mode and a third mode.

22 Claims, 13 Drawing Sheets

Related U.S. Application Data filed on Sep. 17, 2009, provisional application No. 61/244,139, filed on Sep. 21, 2009, provisional application No. 61/257,609, filed on Nov. 3, 2009.

(51) Int. Cl.

| | | |
|---|---|---|
| *H04N 19/176* | (2014.01) | |
| *H04N 19/103* | (2014.01) | |
| *H04N 19/174* | (2014.01) | |
| *H04N 19/13* | (2014.01) | |
| *H04N 19/60* | (2014.01) | |
| *H04N 19/34* | (2014.01) | |

(52) U.S. Cl.
CPC ........... *H04N 19/176* (2014.11); *H04N 19/46* (2014.11); *H04N 19/13* (2014.11); *H04N 19/34* (2014.11); *H04N 19/60* (2014.11)

(58) Field of Classification Search
USPC ......... 348/403.1, 404.1, 408.1, 407.1, 420.1, 348/416.1, 430.1, 699, 700; 382/232, 382/238, 236, 239, 237, 250; 375/240.01–240.26
See application file for complete search history.

(56) References Cited

U.S. PATENT DOCUMENTS

| | | | |
|---|---|---|---|
| 8,509,551 | B2 | 8/2013 | Moriya et al. |
| 8,750,377 | B2 | 6/2014 | Divorra Escoda et al. |
| 8,763,949 | B2 | 7/2014 | Thomassey |
| 2003/0113026 | A1 | 6/2003 | Srinivasan et al. |
| 2003/0169932 | A1 | 9/2003 | Li et al. |
| 2005/0135484 | A1 | 6/2005 | Lee et al. |
| 2007/0030911 | A1 | 2/2007 | Yoon |
| 2007/0133677 | A1 | 6/2007 | Han et al. |
| 2007/0160137 | A1 | 7/2007 | Guo et al. |
| 2008/0112481 | A1 | 5/2008 | Hsaing et al. |
| 2008/0130990 | A1 | 6/2008 | Moriya et al. |
| 2009/0175350 | A1 | 7/2009 | Jeong et al. |
| 2009/0232217 | A1* | 9/2009 | Lee et al. .............. 375/240.16 |
| 2010/0086052 | A1* | 4/2010 | Park et al. ............. 375/240.16 |
| 2010/0220791 | A1 | 9/2010 | Lin et al. |
| 2010/0239015 | A1* | 9/2010 | Wang et al. ........... 375/240.16 |
| 2011/0090960 | A1* | 4/2011 | Leontaris et al. ...... 375/240.12 |
| 2012/0155780 | A1* | 6/2012 | Van Der Vleuten ......... 382/233 |
| 2015/0288962 | A1 | 10/2015 | Srinivasan et al. |

FOREIGN PATENT DOCUMENTS

| | | |
|---|---|---|
| CN | 101448162 A | 6/2009 |
| KR | 1999-0080293 A | 11/1999 |
| KR | 10-2004-0068257 A | 7/2004 |
| KR | 10-2007-0062393 A | 6/2007 |
| KR | 10-2008-0034131 A | 4/2008 |
| KR | 10-2012-0013321 A | 2/2012 |
| KR | 10-2012-0066646 A | 6/2012 |
| WO | 2007/069829 A1 | 6/2007 |
| WO | 2008/127597 A2 | 10/2008 |
| WO | 2009/036255 A2 | 3/2009 |
| WO | 2010/144488 A2 | 12/2010 |
| WO | 2011027256 A1 | 3/2011 |

OTHER PUBLICATIONS

International Search Report, dated May 18, 2011, issued in Application No. PCT/KR2010/006413.
International Search Report, dated May 18, 2011, issued in Application No. PCT/KR2010/006404.
International Search Report, dated May 20, 2011, issued in Application No. PCT/KR2010/006428.
International Search Report, dated Jun. 15, 2011, issued in Application No. PCT/KR2010/006436.
Bjontegaard, Gisle, et al., "Use of Run-length Coding to Identify Coded Macroblocks", 13 VCEG Meeting, Apr. 2-4, 2001, Austin, TX, Videocoding Experts Goup of ITU-T SG.16, No. VCEG-M29, pp. 1-3.
Jo, Youngsub, et al., "Fast Mode Decision Algorithm Using Efficient Block Skip Techniques for H.264 P Slices", Advances in Multimedia, 2009. MMEDIA '09. First International Conference on IEEE, Piscataway, NJ. Jul. 20, 2009, pp. 92-97.
Laroche, Guillaume, et al., "RD Optimized Coding for Motion Vector Predictor Selection", IEEE Transactions on Circuits and Systems for Video Technology, IEEE Service Center, Piscataway, NJ, US, Dec. 1, 2008, vol. 17, No. 12, pp. 1681-1691.
Lee, Bumshik, et al., "SVC NAL Unit Types for Online Extraction", 21. JVT Meeting; 78. MPEG Meeting; Oct. 20-27, 2006; Hangzhou, CN; (Joint Video Team of ISO/IEC JTC1/SC29/WG11 and ITU-T SG. 16), No. JVT-U080, Oct. 22, 2006, pp. 1-9.
Schwarz, Heiko, et al., "Skip Mode for SVC Slice Data Syntax", 19. JVT Meeting; Mar. 31-Apr. 7, 2006 Geneva, CH; (Joint Videoteam of ISO/IEC JTC1/SC29/WG11 and ITU-T SG.16), No. JVT-S068, Mar. 31, 2006, pp. 1-7.
Sjoberg, Rickard, et al., "Run-length Coding of Skipped Macroblocks", ITU Study Group 16—Video Coding Experts, Apr. 2, 2001, pp. 1-5.
Sullivan, Gary, et al., Meeting Report of the Thirteenth Meeting (Meeting M) of the ITU-T Q.6/16 Video Coding Experts Group (VCEG)—Austin, TX, Apr. 2-4, 2001, No. VCEG-M82d1, Jun. 15, 2001, 34 pages total.
Tanizawa, Akiyuki, et al., "Fast Rate-Distortion Optimized Coding Mode Decision for H.264", Electronics & Communications in Japan, Part III—Fundamentalelectronic Science, Wiley, Hoboken, NJ, US, Jan. 1, 2007, vol. 90, No. 9, pp. 41-55.
Yanagihara, Naofumi, et al., "A Video Coding Scheme With a High Compression Ratio for Consumer Digital VCRs", Consumer Electronics, 1993, Digest of Technical Papers ICCE., International Conference on Rosemont, IL, Jun. 8-10, 1993, pp. 22-23.
Zeng, Wenjun, et al., "Rate Shaping by Block Dropping for Transmission of MPEG-precoded Video over Channels of Dynamic Bandwith", Proceedings of ACM Multimedia 96. Boston, Nov. 18-22, 1996, New York, ACM, Nov. 18, 1996, pp. 385-393.
Communication dated Feb. 1, 2013 issued by the European Patent Office in counterpart European Application No. 10817451.7.
Communication dated Mar. 5, 2013 issued by the European Patent Office in counterpart European Application No. 10817454.1.
Communication dated Mar. 25, 2013 issued by the European Patent Office in counterpart European Application No. 10817449.1.
Communication dated Apr. 4, 2013 issued by the European Patent Office in counterpart European Application No. 10817447.5.
Communication from the European Patent Office issued Jan. 2, 2014 in a counterpart European Application No. 10817454.1.
Communication from the European Patent Office issued Feb. 4, 2014 in a counterpart European Application No. 10817441.8.
Communication dated Apr. 14, 2014 issued by the State Intellectual Property Office of P.R. China in counterpart Chinese Patent Application No. 201080041699.6.
Communication dated Jun. 27, 2014 issued by the State Intellectual Property Office of P.R. China in counterpart Chinese Patent Application No. 201080041743.3.
Communication dated Apr. 15, 2014 issued by the State Intellectual Property Office of P.R. China in counterpart Chinese Patent Application No. 201080041744.8.
Communication dated Apr. 22, 2014 issued by the State Intellectual Property Office of P.R. China in counterpart Chinese Patent Application No. 201080041745.2.
Communication dated Jun. 3, 2014 issued by the Japanese Patent Office in counterpart Japanese Patent Application No. 2012-529682.
Communication dated Jun. 3, 2014 issued by the Japanese Patent Office in counterpart Japanese Patent Application No. 2012-529684.
Communication dated Jun. 3, 2014 issued by the Japanese Patent Office in counterpart Japanese Patent Application No. 2012-529686.
Communication dated Jun. 3, 2014 issued by the Japanese Patent Office in counterpart Japanese Patent Application No. 2012-529687.
Communication dated Jun. 3, 2014 issued by the Japanese Patent Office in counterpart Japanese Patent Application No. 2012-529688.

(56) References Cited

OTHER PUBLICATIONS

Sung-Bum Park, et al; "Novel context modeling scheme for lossless image compression using statistical reference"; Proceedings of the 6th International Symposium on Image and Signal Processing and Analysis; Sep. 16, 2009; pp. 250-253.
Communication dated Jun. 7, 2013 issued by the European Patent Office in counterpart European Patent Application No. 10817441.8.
Communication dated Sep. 19, 2013 issued by the European Patent Office in counterpart European Patent Application No. 10817451.7.
Communication dated Nov. 13, 2015, issued by the Korean Intellectual Property Office in corresponding Korean Application No. 10-2010-0010483.
Communication dated Nov. 13, 2015, issued by the Korean Intellectual Property Office in corresponding Korean Application No. 10-2010-0010482.
Communication dated Nov. 25, 2015, issued by the Korean Intellectual Property Office in corresponding Korean Application No. 10-2009-0128343.
Communication issued Feb. 13, 2016, issued by the Korean Intellectual Property Office in counterpart Korean Patent Application No. 10-2009-0115931.
Communication from the State Intellectual Property Office of P.R. China dated Aug. 4, 2015 in a counterpart Chinese application No. 201080041746.7.
Communication dated Nov. 21, 2016, issued by the Korean Intellectual Property office in counterpart Korean Patent Application No. Oct. 2009-0115931 English translation.

\* cited by examiner

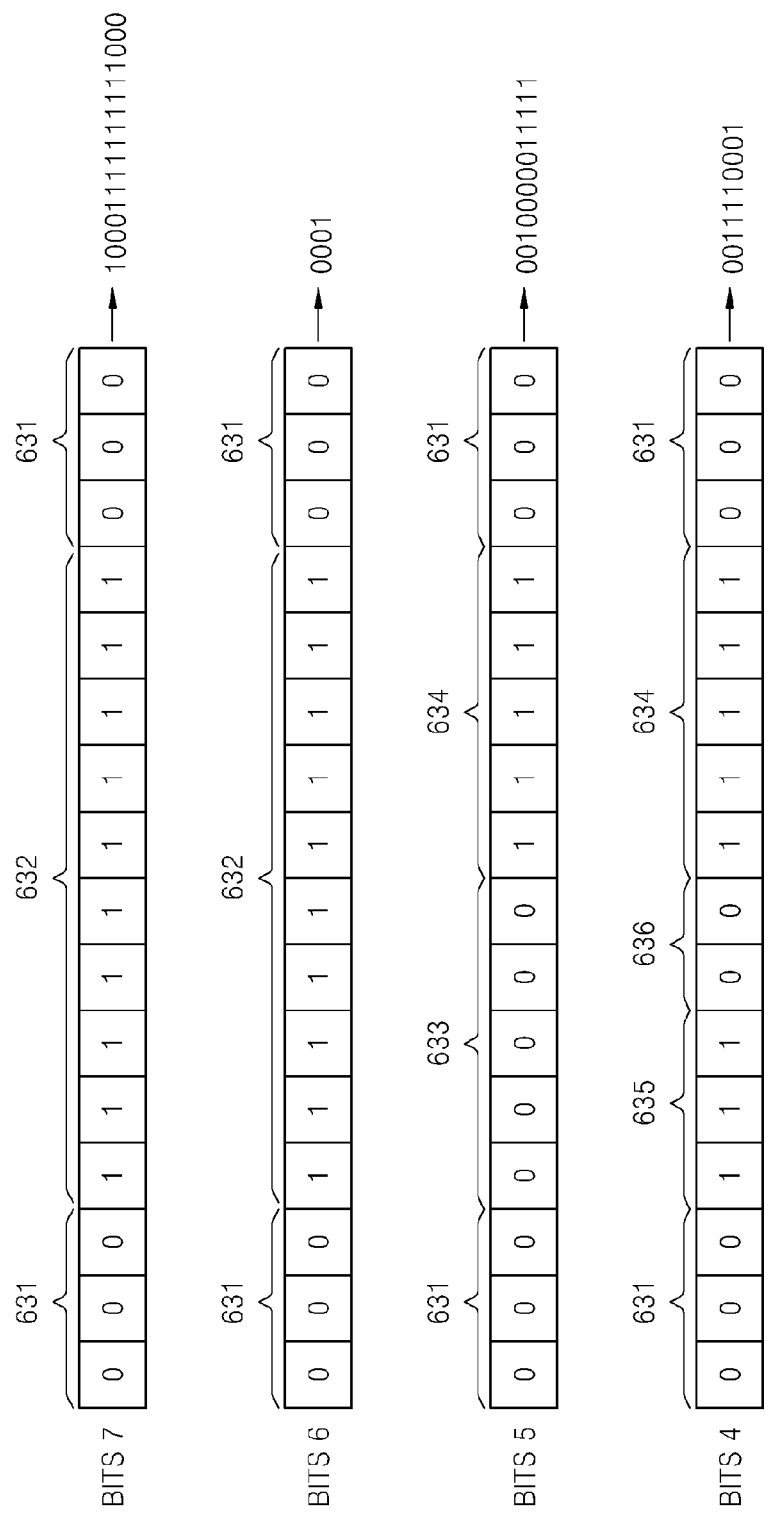

METHODS AND APPARATUSES FOR ENCODING AND DECODING MODE INFORMATION

CROSS-REFERENCE TO RELATED PATENT APPLICATION

This application claims the benefits of U.S. Provisional Patent Application Nos. 61/243,216, filed on Sep. 17, 2009, 61/243,218, filed on Sep. 17, 2009, 61/244,139, filed on Sep. 21, 2009, and 61/257,609, filed on Nov. 3, 2009, in the U.S. Patent and Trademark Office, the disclosures of which are incorporated herein by reference in their entireties.

BACKGROUND

1. Field

Exemplary embodiments relate to methods and apparatuses for encoding and decoding mode information, and more particularly, to methods and apparatuses for encoding and decoding mode information of an image that is encoded in a plurality of modes.

2. Description of the Related Art

As wireless networks develop, interconnection technologies between devices in a wireless network become an issue and many companies try to develop such technologies. In particular, currently, an uncompressed high definition (HD) interconnection technology for replacing a high definition multimedia interface (HDMI) technology is being standardized in the wireless HD (WiHD) specification. According to the WiHD specification, various devices, such as televisions (TVs), home theaters, digital versatile disc (DVD) players, Blueray players, and camcorders, may be interconnected in a wireless network.

SUMMARY

Exemplary embodiments provide methods and apparatuses for encoding and decoding mode information of an image that is encoded in a plurality of modes, and computer-readable recording media having respectively recorded thereon a computer program for executing the encoding and decoding methods.

According to an exemplary embodiment, there is provided a method of decoding mode information of a current block of an image, the method including decoding first information that indicates whether the current block is encoded in a first encoding mode; in response to determining that the current block is not encoded in the first encoding mode, decoding second information that indicates an encoding mode of the current block from among a second encoding mode and a third encoding mode; and determining a decoding mode to be used to decode the current block, based on at least one of the decoded first information and the decoded second information, wherein the first encoding mode indicates that the current block is identical to a second block that is encoded prior to the current block, the current block adjacent to the second block in a slice of the image.

The second encoding mode may be an encoding mode that encodes the current block based on discrete cosine transformation (DCT), and the third encoding mode may be an encoding mode that encodes the current block based on a plurality of bit planes of pixel values.

The decoding of the first information may include selectively parsing the first information, based on third information that indicates whether the slice includes a block that is encoded in the first encoding mode.

The selective parsing of the first information may include determining whether the slice includes the block that is encoded in the first encoding mode, based on the third information, and in response to determining that the slice includes the block that is encoded in the first encoding mode, based on the third information, parsing the first information.

The selective parsing of the first information may include determining whether the slice includes the block that is encoded in the first encoding mode, based on the third information, and determining whether the slice includes a block that is encoded in the second encoding mode, or a block that is encoded in the third encoding mode, based on fourth information; and in response to determining that the slice includes the block that is encoded in the first encoding mode, and the slice includes the block that is encoded in the second encoding mode or the block that is encoded in the third encoding mode, based on the third information and the fourth information, parsing the first information.

The decoding of the second information may include in response to determining that the current block is not encoded in the first encoding mode, based on the decoded first information, selectively parsing the second information, based on fourth information that indicates whether the slice includes both a block that is encoded in the second encoding mode and a block that is encoded in the third encoding mode.

The selective parsing of the second information may include determining whether the slice includes both the block that is encoded in the second encoding mode and the block that is encoded in the third encoding mode, based on the fourth information; and in response to determining that the slice includes both the block that is encoded in the second encoding mode and the block that is encoded in the third encoding mode, based on the fourth information, parsing the second information.

The second encoding mode may be an encoding mode that performs DCT on the pixel values of the current block to generate DCT coefficients, separates the DCT coefficients into a plurality of bit planes from a bit plane of most significant bits (MSBs) to a bit plane of least significant bits (LSBs), and encodes the DCT coefficients in units of bit planes.

The third encoding mode may be an encoding mode that separates the pixel values of the current block into a plurality of bit planes from a bit plane of most significant bits (MSBs) to a bit plane of least significant bits (LSBs), and encodes the pixel values in units of bit planes.

According to another exemplary embodiment, there is provided a method of encoding mode information of a current block of an image, the method including determining an encoding mode of the current block from among a first encoding mode, a second encoding mode, and a third encoding mode; encoding first information that indicates whether the current block is encoded in the first encoding mode; and in response to determining that the encoding mode of the current block is not the first encoding mode, encoding second information that indicates whether the encoding mode of the current block is one of the second encoding mode and the third encoding mode, wherein the first encoding mode indicates that the current block is identical to a second block that is encoded prior to the current block, the current block adjacent to the second block in a slice of the image.

According to another exemplary embodiment, there is provided an apparatus for decoding mode information of a current block of an image, the apparatus including a first information decoder that decodes first information that indicates whether the current block is encoded in a first encoding mode and determines whether the current block is encoded in the first encoding mode based on the decoded first information; a second information decoder that, in response to the first information decoder determining that the current block is not encoded in the first encoding mode, decodes second information that indicates an encoding mode of the current block from among a second encoding mode and a third encoding mode; and a mode determination unit that determines a decoding mode to be used to decode the current block, based on at least one of the decoded first information and the decoded second information, wherein the first encoding mode is indicates that the current block is identical to a second block that is encoded prior to the current block, the current block adjacent to the second block in a slice of the image.

According to another exemplary embodiment, there is provided an apparatus for encoding mode information of a current block of an image, the apparatus including a mode determination unit that determines an encoding mode of the current block from among a first encoding mode, a second encoding mode, and a third encoding mode; a first information encoder that encodes first information that indicates whether the current block is encoded in the first encoding mode; and a second information encoder that, in response to the mode determination unit determining that the current block is not encoded in the first encoding mode, encoding second information that indicates whether the encoding mode of the current block is one of the second encoding mode and the third encoding mode, wherein the first encoding mode indicates that the current block is identical to a second block that is encoded prior to the current block, the current block adjacent to the second block in a slice of the image.

According to additional exemplary embodiments, there are provided computer-readable recording media having respectively recorded thereon a computer program for executing the method of encoding mode information and the method of decoding the mode information.

BRIEF DESCRIPTION OF THE DRAWINGS

The above and other features and advantages will become more apparent by describing in detail exemplary embodiments thereof with reference to the attached drawings in which:

FIG. 6B is a diagram for describing a bit plane-based encoding method according to an exemplary embodiment;

DETAILED DESCRIPTION

Hereinafter, exemplary embodiments will be described in detail with reference to the attached drawings.

Figure 1:
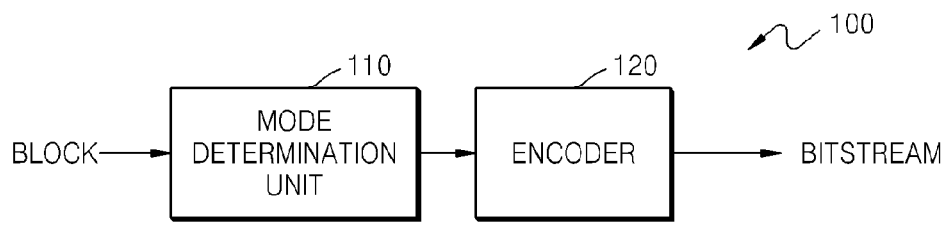
FIG. 1 is a block diagram of an image encoding apparatus according to an exemplary embodiment.

FIG. 1 is a block diagram of an image encoding apparatus 100 according to an exemplary embodiment.

Referring to FIG. 1, the image encoding apparatus 100 includes a mode determination unit 110 and an encoder 120.

The mode determination unit 110 determines an encoding mode of a current block. Devices are interconnected in a wireless network to transmit and receive high quality contents above a high definition (HD) level. A standard for allowing interconnection between various devices is now being established with a focus on a small memory and low complexity. Accordingly, since image encoding also requires low complexity, complex methods, such as MPEG-1, MPEG-2, and MPEG-4 H.264/MPEG-4 advanced video coding (AVC) methods, for increasing a compression ratio are not used.

However, if an image is transmitted without compressing pixel values of the image, a wireless network having a high transmission rate is required, and thus interconnection between various devices may also be interrupted. Accordingly, if an image is encoded and decoded by using three modes, such as a skip mode, a natural mode, and a graphic mode, to be described below, low complexity and an appropriate level of compression ratio may be ensured.

The skip mode is a mode for encoding a current block based on whether the current block is identical or similar to a neighboring block of the current block. The natural mode is a mode for encoding a current block by performing discrete cosine transformation (DCT) and bit plane splitting, if the current block is a block of a natural image. The graphic mode is a mode for encoding a current block by performing bit plane splitting, if the current block is a block of an artificial image, such as a text image. The skip mode, the natural mode, and the graphic mode will be described in detail with reference to FIGS. 3 through 5.

The mode determination unit 110 determines one of the above-mentioned modes to be used to encode the current block. Initially, the mode determination unit 110 determines whether the current block is identical or similar to a neighboring block that is encoded prior to the current block in a current slice, by comparing pixel values of the current block to pixel values of the neighboring block. Operation of the mode determination unit 110 will be described in detail with reference to FIGS. 2 and 3.

Figure 2:
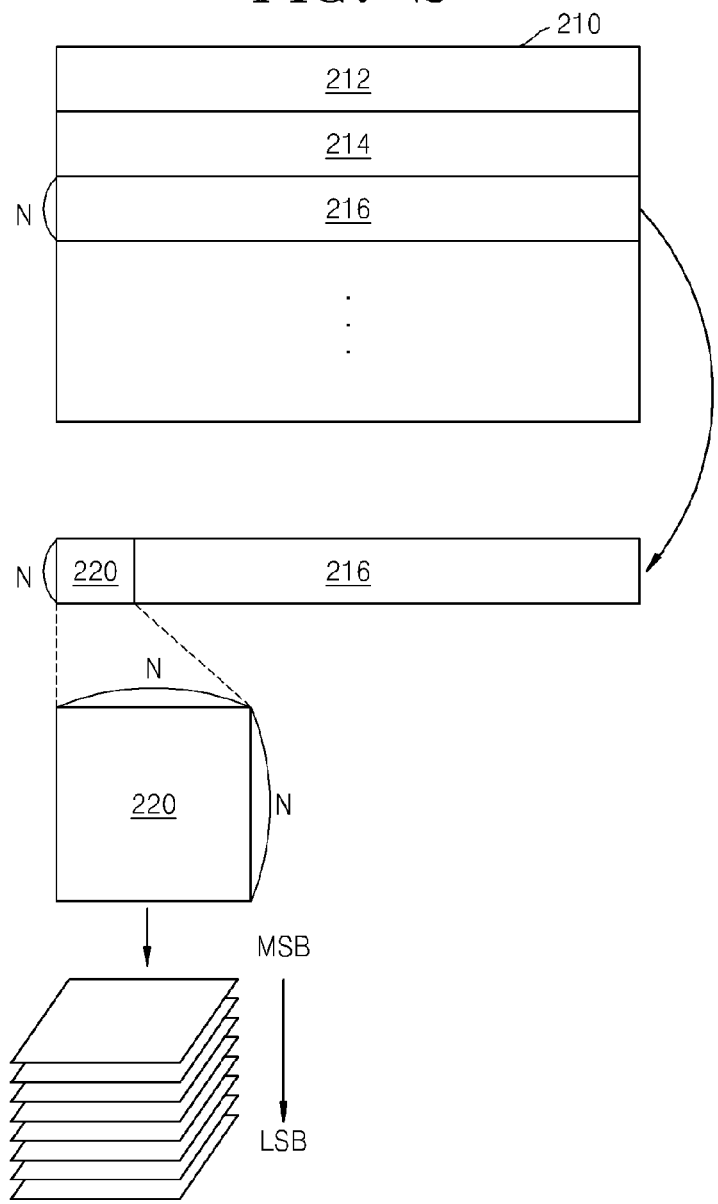
FIG. 2 is a diagram illustrating an image encoding unit according to an exemplary embodiment.

FIG. 2 is a diagram illustrating an image encoding unit 210 according to an embodiment of the present invention.

Referring to FIG. 2, the image encoding apparatus 100 encodes an image by splitting the image in units of slices, blocks, and bit planes. The image encoding apparatus 100 splits a current picture 210 into a plurality of slices 212, 214, and 216, each slice having N rows of pixels. The image encoding apparatus 100 splits each of the slices 212, 214, and 216 into N×N blocks 220, and then splits each of the N×N blocks 220 into a plurality of bit planes from a bit plane of most significant bits (MSBs) to a bit plane of least significant bits (LSBs). If pixel values or DCT coefficients of a block 220 are represented by M bits, the block 220 may be split into M bit planes.

Figure 3:
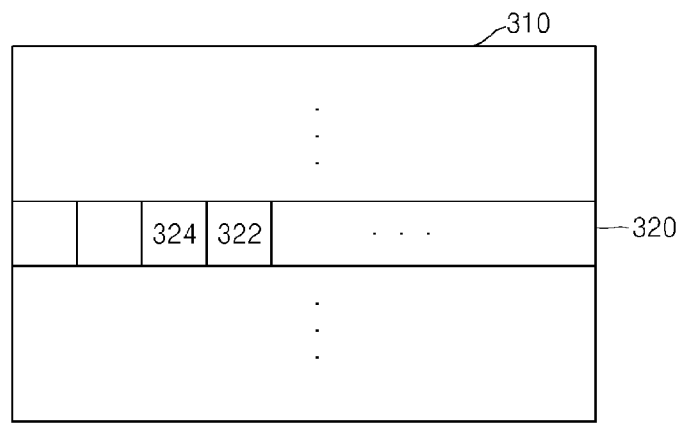
FIG. 3 is a diagram for describing a method of determining a skip mode, according to an exemplary embodiment.

FIG. 3 is a diagram for describing a method of determining a skip mode, according to an exemplary embodiment.

Referring to FIG. 3, as described above in relation to FIG. 2, a current picture 310 may be split into a plurality of slices. A case when the image encoding apparatus 100 encodes a current slice 320 will be described.

In order to encode a current block 322 of the current slice 320, the mode determination unit 110 of the image encoding apparatus 100 decides whether the current block 322 is identical or similar to a neighboring block 324 that is encoded prior to the current block 322. In general, a current block that is spatially adjacent to a neighboring block is likely to be identical or similar to the neighboring block. Accordingly, the mode determination unit 110 may determine an encoding mode of the current block 322 as the skip mode, if the current block 322 is identical or similar to the neighboring block 324 that is encoded prior to the current block 322 (illustrated as on the left of the current block 322 in FIG. 3). The neighboring block 324 may be a block that is encoded immediately prior to the current block 322.

Whether the current block 322 is identical or similar to the neighboring block 324 may be determined by using any of various methods. A cost is calculated based on a sum of absolute differences (SAD), a mean square error (MSE), a signal to noise ratio (SNR), or a maximum difference between the current block 322 and the neighboring block 324, and whether the current block 322 is identical or similar to the neighboring block 324 is determined according to the calculated cost. If the SAD, the MSE, or the maximum difference has or is close to a value of '0', it may be determined that the current block 322 is identical or sufficiently similar to the neighboring block 324.

The encoding mode of the current block 322 may be determined as the skip mode only when the mode determination unit 110 determines that the current block 322 is completely identical to the neighboring block 324, or when the mode determination unit 110 determines that the current block 322 is sufficiently similar to the neighboring block 324. In other words, the encoding mode of the current block 322 may be determined as the skip mode only when the SAD, the MSE, or the maximum difference has a value '0', or when the SAD, the MSE, or the maximum difference is equal to or less than a predetermined threshold value. Thus, if the SAD, the MSE, or the maximum difference is equal to or less than a predetermined threshold value, it is determined that the current block 322 is sufficiently similar to the neighboring block 324.

If the mode determination unit 110 determines that the encoding mode of the current block 322 is not the skip mode, the mode determination unit 110 determines the encoding mode of the current block 322 to be one of a natural mode and a graphic mode. If the current block 322 is a block of a natural image, i.e., a non-artificial image, the mode determination unit 110 determines the encoding mode of the current block 322 to be the natural mode. Otherwise, if the current block 322 is a block of an artificial image, such as a text image or a computer graphic image, the mode determination unit 110 determines the encoding mode of the current block 322 to be the graphic mode.

The method of determining whether the current block 322 is a block of a natural image or a block of an artificial image is not restrictive, and any of various algorithms may be used. For example, since identical pixel values are likely to be distributed in a certain region of an artificial image, pixel values of the current block 322 may be compared. If the number of identical pixel values is equal to or greater than a predetermined number, it may be determined that the current block 322 is a block of an artificial image.

According to another exemplary embodiment, the current block 322 may be individually encoded in the natural mode and the graphic mode, and then the encoding mode of the current block may be determined as the natural mode or the graphic mode, based on rate distortion (RD) costs of the encoded blocks. The method using the RD costs will be described with reference to FIG. 7.

Referring back to FIG. 1, when the mode determination unit 110 determines the encoding mode of the current block, the encoding unit 120 encodes the current block in the encoding mode determined by the mode determination unit 110.

If the current block is identical or similar to the neighboring block, and thus the encoding mode of the current block is determined to be the skip mode, the encoding unit 120 encodes information, e.g., flag information, representing that the current block is encoded in the skip mode, instead of encoding the pixel values of the current block.

Since flag information of one bit may be encoded, instead of encoding all of the pixel values of the current block, an image compression ratio is improved. Also, since only the neighboring block encoded immediately prior to the current block is referred, in order to encode the current block in the skip mode, the skip mode requires low complexity.

If the current block is not identical or similar to the neighboring block, and thus the encoding mode of the current block is determined not to be the skip mode, the encoding unit 120 encodes the current block in the natural mode or the graphic mode. If the mode determination unit 110 determines the encoding mode of the current block to be the natural mode, the encoding unit 120 encodes the current block in the natural mode. Otherwise, if the mode determination unit 110 determines the encoding mode of the current block to be the graphic mode, the encoding unit 120 encodes the current block in the graphic mode. The encoding methods in the natural mode and the graphic mode will be described in detail with reference to FIGS. 4, 5, 6A, and 6B.

Figure 4:
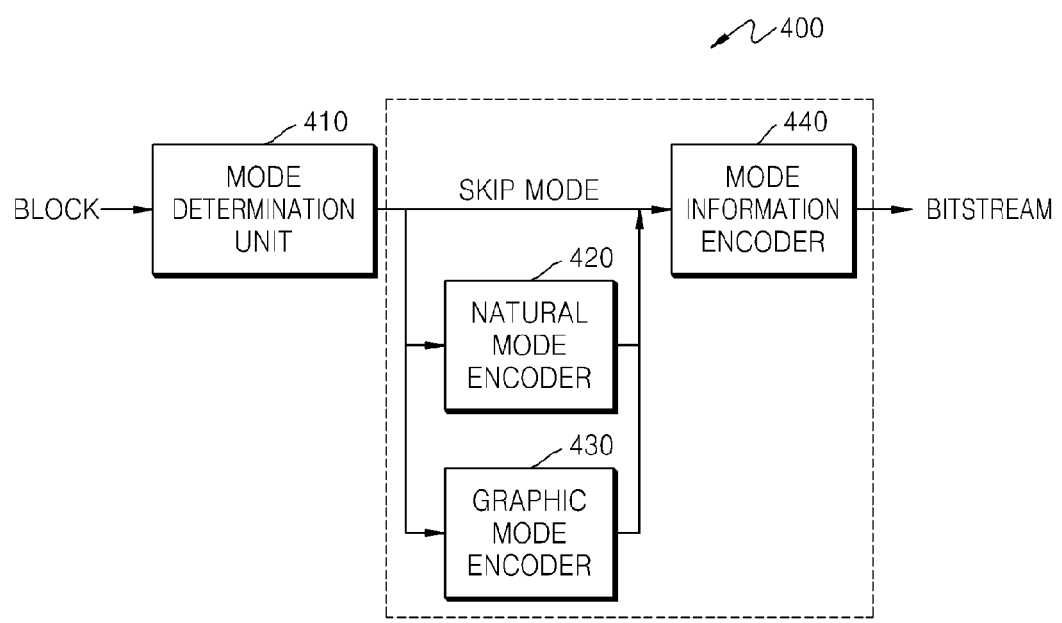
FIG. 4 is a block diagram of an image encoding apparatus according to an exemplary embodiment.

FIG. 4 is a block diagram of an image encoding apparatus 400 according to another exemplary embodiment.

Referring to FIG. 4, the image encoding apparatus 400 includes a mode determination unit 410, a natural mode encoder 420, a graphic mode encoder 430, and a mode information encoder 440. The mode determination unit 410 corresponds to the mode determination unit 110 illustrated in FIG. 1, and the natural mode encoder 420, the graphic mode encoder 430, and the mode information encoder 440 correspond to the encoding unit 120 illustrated in FIG. 1.

The mode determination unit 410 determines an encoding mode of a current block, from among a skip mode, a natural mode, and a graphic mode.

If the mode determination unit 410 determines the encoding mode of the current block to be the skip mode, the mode information encoder 440 encodes information, e.g., flag information, indicating that the current block is encoded in the skip mode, instead of encoding pixel values of the current block.

If the mode determination unit 410 determines the encoding mode of the current block to be the natural mode, the natural mode encoder 420 encodes the current block in the natural mode by performing DCT on the current block to generate DCT coefficients, separating the generated DCT coefficients into a plurality of bit planes, and encoding each of the bit planes by using a bit plane-based encoding method. The encoding method in the natural mode will now be described in detail with reference to FIG. 5.

Figure 5:
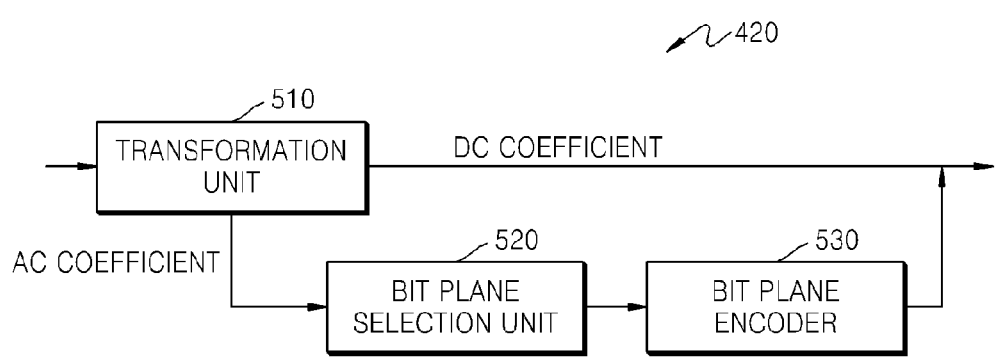
FIG. 5 is a block diagram of a natural mode encoder of the image encoding apparatus illustrated in FIG. 4, according to an exemplary embodiment.

FIG. 5 is a block diagram of the natural mode encoder 420 of the image encoding apparatus 400 illustrated in FIG. 4.

Referring to FIG. 5, the natural mode encoder 420 includes a transformation unit 510, a bit plane selection unit 520, and a bit plane encoder 530.

The transformation unit 510 performs DCT on a current block to generate DCT coefficients. DCT is only an exemplary method of transforming pixel values of the pixel domain to the frequency domain and generating frequency domain coefficients, and one of ordinary skill in the art will easily understand that other methods may be used to transform the current block.

From among the DCT coefficients generated when the transformation unit 510 performs DCT on the current block, bitstreams of direct current (DC) coefficients are constantly maintained. However, alternating current (AC) coefficients are encoded by using a bit plane-based encoding method.

The bit plane selection unit 520 separates the AC coefficients into a plurality of bit planes from a bit plane of MSBs to a bit plane of LSBs. M-bit AC coefficients are separated in units of bits to generate M bit planes. A first bit plane of the MSBs in bitstreams of the AC coefficients is generated, and a second bit plane of second MSBs in the bitstreams is generated. This operation is repeated to the LSBs to generate the M bit planes.

When the bit plane selection unit 520 generates the bit planes, the bit plane encoder 530 encodes each of the generated bit planes by using a bit plane-based encoding method. A method of encoding the bit planes is not restrictive and conventional bit plane-based encoding methods may be used. Also, according to an exemplary embodiment, each of the bit planes may be encoded by using a bit mask. A region having significant bits may be set in each of the bit planes by using the bit mask, and bit plane-based encoding may be performed on only the set region.

The method of separately encoding the DC coefficients and the AC coefficients is described above in relation to FIG. 5. However, the above method is exemplarily described and the natural mode encoder 420 may use other methods of encoding the current block by performing DCT and by using a bit plane-based encoding method.

Referring back to FIG. 4, if the mode determination unit 410 determines the encoding mode of the current block to be the graphic mode, the graphic mode encoder 430 encodes the current block in the graphic mode, by separating the pixel values of the current block into a plurality of bit planes, and encoding each of the bit planes, by using a bit plane-based encoding method. The encoding method in the graphic mode will now be described in detail with reference to FIGS. 6A and 6B.

Figure 6A:
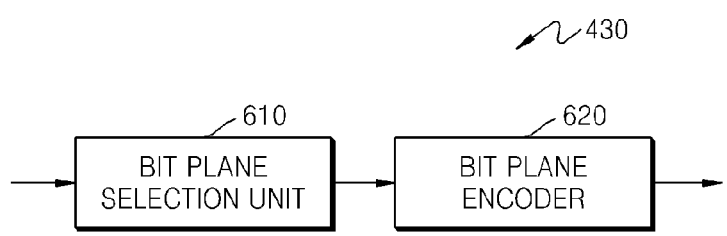
FIG. 6A is a block diagram of a graphic mode encoder of the image encoding apparatus illustrated in FIG. 4, according to an exemplary embodiment.

FIG. 6A is a block diagram of the graphic mode encoder 430 of the image encoding apparatus illustrated in FIG. 4.

Referring to FIG. 6A, the graphic mode encoder 430 includes a bit plane selection unit 610 and a bit plane encoder 620.

The bit plane selection unit 610 separates pixel values of a current block into a plurality of bit planes. P-bit pixel values are separated in units of bits from a bit plane of MSBs to a bit plane of LSBs, and thus P bit planes are generated.

When the bit plane selection unit 610 generates the bit planes, the bit plane encoder 620 encodes each of the generated bit planes by using a bit plane-based encoding method.

FIG. 6B is a diagram for describing a bit plane-based encoding method according to an exemplary embodiment.

Referring to FIG. 6B, the bit plane encoder 620 encodes a bit plane by grouping identical bit values. A case when a current block has a size of 4×4 and 8-bit pixel values will be described. The bit plane encoder 620 initially encodes a bit plane of bits 7 that are MSBs, as illustrated in FIG. 6B. The bit plane of bits 7 is encoded by separating a group 631, having a value '0', from a group 632, having a value '1'. Since the bit plane of bits 7 is divided into the groups 631 and 632, according to a bit value, a value '1' is initially encoded, and then a value '0001111111111000' representing individual bits of the groups 631 and 632 is encoded.

A bit plane of bits 6 is encoded based on whether each of the groups 631 and 632 in the bit plane of bits 7 is split into groups having different bit values. In FIG. 6B, since both of the group 631, having a value '0', and the group 632, having a value '1', are not split, a value '00' representing that the group 631, having a value '0', is not split and a value '01', representing the group 632, having a value '1', is not split are encoded.

In a bit plane of bits 5, the group 632, having a value '1' in the bit plane of bits 6, is split into two groups 633 and 634. Accordingly, a value '00', representing that the group 631 having a value '0' is not split, is initially encoded and then a value '1', representing that the group 632 having a value '1' is split, is encoded. Then, a value '0000011111', representing individual bits of the groups 634 and 644 split from the group 632 having a value '1', is encoded.

In a bit plane of bits 4, the group 633, having a value '0', which is split from the group 632, having a value '1', is split into two groups 635 and 636. Accordingly, a value '00', representing that the group 631 having a value '0' is not split, is initially encoded. Also, a value '1', representing that the group 633 having a value '0' is split, which is split from the group 632 having a value '1', is encoded, and a value '11100', representing individual bits of the groups 635 and 636 split from the group 633, is encoded. After that, a value '01', representing that the group 634 having a value '1' is not split, is encoded.

The bit plane encoder 620 encodes every bit plane to a bit plane of LSBs by repeatedly performing a bit plane-based encoding method based on bit groups generated by grouping identical bit values, as described above.

Referring back to FIG. 4, the mode information encoder 440 encodes information indicating the encoding mode of the current block. If the mode determination unit 410 determines the encoding mode of the current block to be the skip mode, the mode information encoder 440 encodes information, e.g., flag information, indicating that the current block is encoded in the skip mode.

If the mode determination unit 410 determines the encoding mode of the current block to be the natural mode or the graphic mode, as in the skip mode, the mode information encoder 440 encodes information, e.g., flag information, representing that the current block is encoded in the natural mode or the graphic mode.

Also, the mode information encoder 440 may encode information, e.g., flag information, indicating whether a current slice, which includes the current block, includes blocks encoded in the skip mode, the natural mode, or the graphic mode. The flag information representing the current slice may be a syntax element of the current slice.

Figure 7:
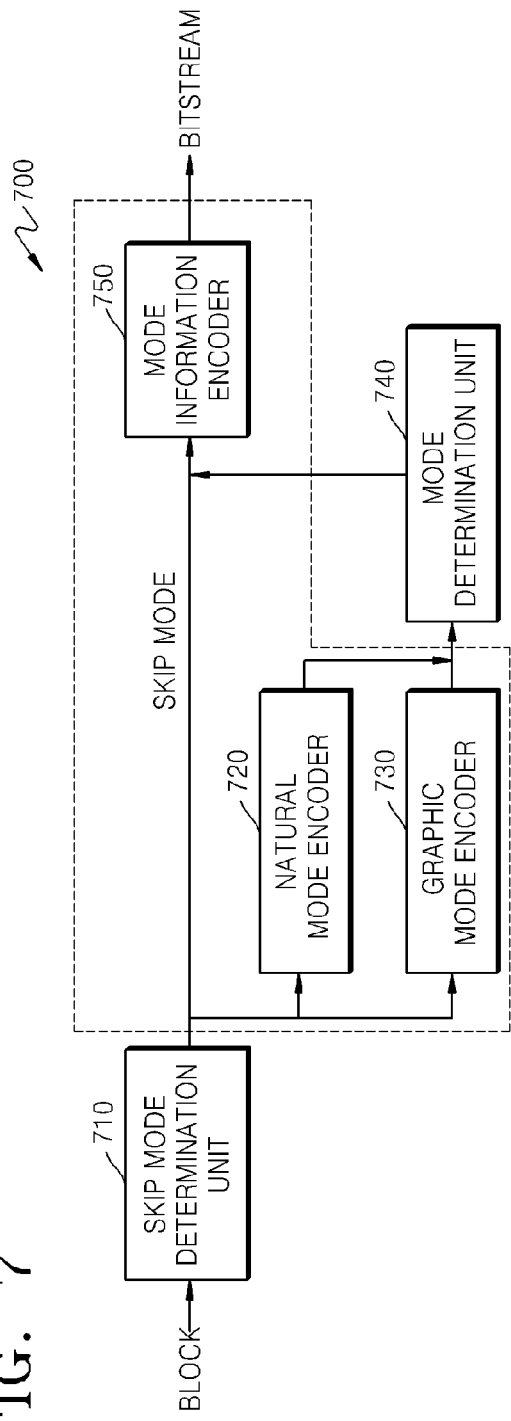
FIG. 7 is a block diagram of an image encoding apparatus according to an exemplary embodiment.

FIG. 7 is a block diagram of an image encoding apparatus 700 according to another exemplary embodiment.

Referring to FIG. 7, the image encoding apparatus 700 includes a skip mode determination unit 710, a natural mode encoder 720, a graphic mode encoder 730, a mode determination unit 740, and a mode information encoder 750.

The skip mode determination unit 710 and the mode determination unit 740 correspond to the mode determination unit 110 illustrated in FIG. 1, and the natural mode encoder 720, the graphic mode encoder 730, and the mode information encoder 750 correspond to the encoding unit 120 illustrated in FIG. 1.

The skip mode determination unit 710 determines whether to encode a current block in a skip mode. The skip mode determination unit 710 compares pixel values of the current block to pixel values of a neighboring block that is encoded prior to the current block, and determines the encoding mode of the current block to be the skip mode if the current block is identical or similar to the neighboring block.

If the skip mode determination unit 710 determines the encoding mode of the current block to be the skip mode, the mode information encoder 750 encodes information, e.g., flag information, indicating that the current block is encoded in the skip mode.

If the skip mode determination unit 710 does not determine the encoding mode of the current block to be the skip mode, the natural mode encoder 720 and the graphic mode encoder 730 respectively encode the current block in a natural mode and a graphic mode.

The mode determination unit 740 compares the blocks encoded by the natural mode encoder 720 and the graphic mode encoder 730, and determines whether to encode the current block in the natural mode or the graphic mode.

The mode determination unit 740 calculates RD costs, based on a result of encoding the current block in the natural mode and a result of encoding the current block in the graphic mode, according to the equation cost=(rate)+(lambda)×(distortion), and determines one of the natural mode and the graphic mode, which has a lower cost, as the encoding mode of the current block. A value of 'lambda' may be variably set according to an exemplary embodiment, and a reference value for selecting the natural mode or the graphic mode may be changed by adjusting the value of 'lambda'.

If the mode determination unit 740 determines the encoding mode of the current block to be the natural mode or the graphic mode, the mode information encoder 750 encodes information, e.g., flag information, indicating that the current block is encoded in the natural mode or the graphic mode.

Also, as described above in relation to FIG. 6, further to the encoding of the information indicating the encoding mode of the current block, the mode information encoder 750 may encode information that indicates whether a current slice includes blocks encoded in the skip mode, the natural mode, or the graphic mode.

Figure 8:
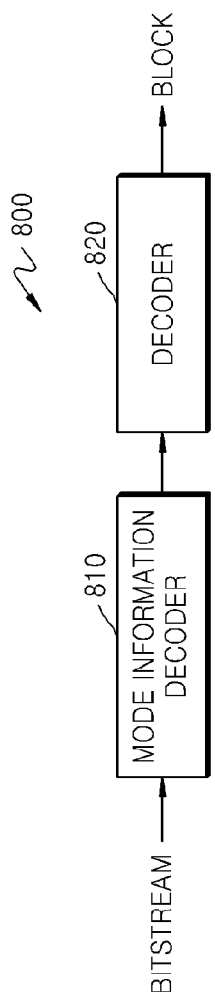
FIG. 8 is a block diagram of an image decoding apparatus according to an exemplary embodiment.

FIG. 8 is a block diagram of an image decoding apparatus 800 according to an exemplary embodiment.

Referring to FIG. 8, the image decoding apparatus 800 includes a mode information decoder 810 and a decoder 820.

The mode information decoder 810 decodes information that indicates an encoding mode of a current block, which is included in a bitstream. The mode information decoder 810 decodes information that indicates whether the current block is encoded in a skip mode, a natural mode, or a graphic mode, by parsing the bitstream.

The decoder 820 decodes the current block based on the information decoded by the mode information decoder 810. If the decoded information indicates that the current block is encoded in the skip mode, the decoder 820 restores the current block, based on a block that is identical or similar to the current block, i.e., a neighboring block decoded prior to the current block. The neighboring block may be a block that is decoded immediately prior to the current block. If the decoded information represents that the current block is encoded in the natural mode or the graphic mode, the decoder 820 restores the current block by inversely performing the encoding operations described above in relation to FIGS. 5 and 6A. The decoding method of the current block will be described in detail with reference to FIG. 9.

Figure 9:
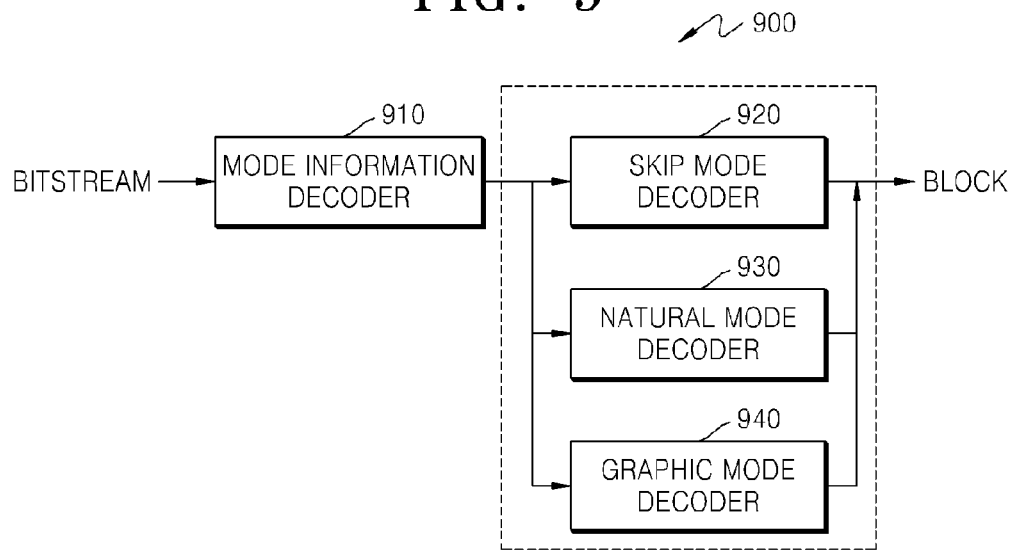
FIG. 9 is a block diagram of an image decoding apparatus according to an exemplary embodiment.

FIG. 9 is a block diagram of an image decoding apparatus 900 according to another exemplary embodiment.

Referring to FIG. 9, the image decoding apparatus 900 includes a mode information decoder 910, a skip mode decoder 920, a natural mode decoder 930, and a graphic mode decoder 940. The mode information decoder 910 corresponds to the mode information decoder 810 illustrated in FIG. 8, and the skip mode decoder 920, the natural mode decoder 930, and the graphic mode decoder 940 correspond to the decoder 820 illustrated in FIG. 8.

Like the mode information decoder 810, the mode information decoder 910 decodes information that indicates an encoding mode of a current block, which is included in a bitstream.

The skip mode decoder 920 decodes the current block in a skip mode, if the decoded information represents that the current block is encoded in the skip mode. The skip mode decoder 920 restores the current block based on a neighboring block decoded prior to the current block. In this case, the current block may be restored by copying the neighboring block.

The natural mode decoder 930 decodes the current block in a natural mode, if the decoded information represents that the current block is encoded in the natural mode. The natural mode decoder 930 initially parses DC coefficients from among DCT coefficients included in the bitstream, and restores a plurality of bit planes of AC coefficients from among the DCT coefficients, by using a bit plane-based decoding method. If the AC coefficients are restored, by combining the restored bit planes, inverse DCT (IDCT) is performed, based on the restored AC coefficients and the parsed DC coefficients. As such, the current block is restored.

The graphic mode decoder 940 decodes the current block in a graphic mode, if the decoded information represents that the current block is encoded in the graphic mode. The graphic mode decoder 940 restores a plurality of bit planes of pixel values of the current block, by using a bit plane-based decoding method, and restores the pixel values of the current block, by combining the restored bit planes.

Figure 10:
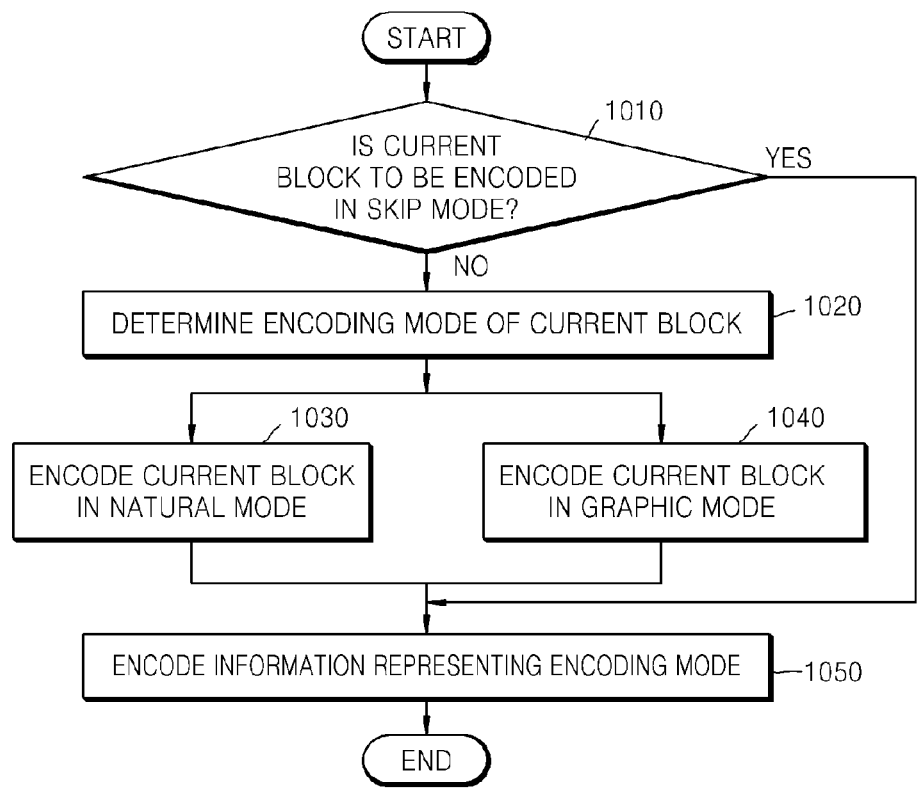
FIG. 10 is a flowchart of an image encoding method according to an exemplary embodiment.

FIG. 10 is a flowchart of an image encoding method according to an exemplary embodiment.

Referring to FIG. 10, in operation 1010, the image encoding apparatus 100 or 400 illustrated in FIG. 1 or 4 determines whether to encode a current block in a skip mode. The skip mode is a mode for encoding information indicating that the current block is encoded in the skip mode, instead of encoding pixel values of the current block, when the current block is identical or similar to a neighboring block of the current block.

If it is determined in operation 1010 that the encoding mode of the current block is not the skip mode, in operation 1020, the image encoding apparatus 100 or 400 determines whether to encode the current block in a natural mode or a graphic mode. As described above in relation to the mode determination unit 110 illustrated in FIG. 1, the encoding mode of the current block may be determined as the natural mode or the graphic mode based on whether the current block is a block of a natural image or a block of an artificial image.

If it is decided that the current block is a block of a natural image in operation 1020, the current block is encoded in the natural mode, in operation 1030. In operation 1030, the image encoding apparatus 100 or 400 encodes the current block in the natural mode. The encoding method in the natural mode is described above in relation to FIG. 5.

If it is decided that the current block is a block of an artificial image in operation 1020, the current block is encoded in the graphic mode, in operation 1040. In operation 1040, the image encoding apparatus 100 or 400 encodes the current block in the graphic mode. The encoding method in the graphic mode is described above in relation to FIG. 6A.

In operation 1050, the image encoding apparatus 100 or 400 encodes information representing the encoding mode of the current block. If the encoding mode of the current block is determined as the skip mode in operation 1010, the image encoding apparatus 100 or 400 encodes information indicating that the current block is encoded in the skip mode, instead of encoding the pixel values of the current block. If the encoding mode of the current block is not determined to be the skip mode in operation 1010, and the current block is encoded in the natural mode or the graphic mode in operation 1030 or 1040, the image encoding apparatus 100 or 400 encodes information indicating that the current block is encoded in the natural mode or the graphic mode.

Figure 11:
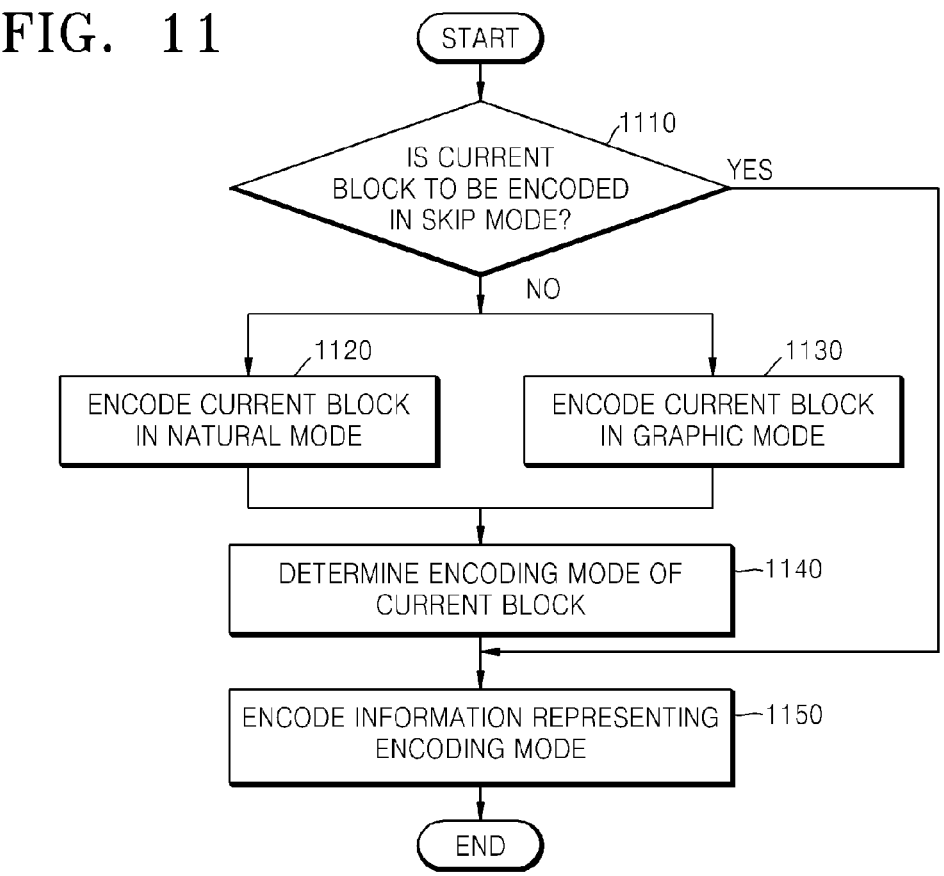
FIG. 11 is a flowchart of an image encoding method according to an exemplary embodiment.

FIG. 11 is a flowchart of an image encoding method according to another exemplary embodiment.

Referring to FIG. 11, in operation 1110, the image encoding apparatus 100 or 700 illustrated in FIG. 1 or 7 determines whether to encode a current block in a skip mode. Operation 1110 corresponds to operation 1010 illustrated in FIG. 10.

If the encoding mode of the current block is not determined as the skip mode in operation 1110, the image encoding apparatus 100 or 700 separately encodes the current block in a natural mode and a graphic mode, in operation 1120 and 1130.

In operation 1140, the image encoding apparatus 100 or 700 compares a result of encoding the current block in the natural mode to a result of encoding the current block in the graphic mode, and determines the encoding mode of the current block. The image encoding apparatus 100 or 700 calculates RD costs based on the results of encoding the current block in the natural mode and the graphic mode, and determines one of the natural mode and the graphic mode, which has a lower cost, as the encoding mode of the current block.

In operation 1150, the image encoding apparatus 100 or 700 encodes information that indicates the encoding mode of the current block. If the encoding mode of the current block is determined to be the skip mode in operation 1110, the image encoding apparatus 100 or 700 encodes information representing that the current block is encoded in the skip mode, instead of encoding pixel values of the current block. If the encoding mode of the current block is not determined to be the skip mode in operation 1110, and is determined as the natural mode or the graphic mode in operation 1140, the image encoding apparatus 100 or 700 encodes information indicating that the current block is encoded in the natural mode or the graphic mode.

Figure 12:
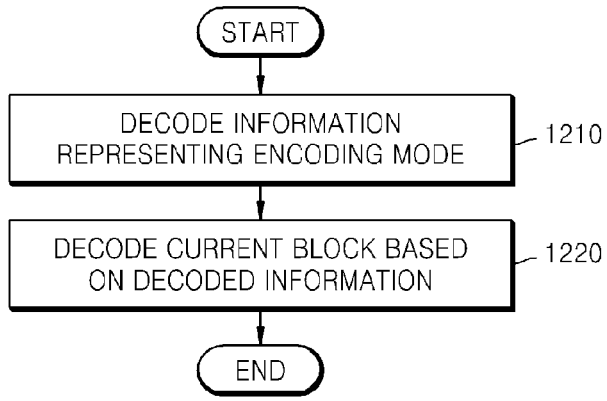
FIG. 12 is a flowchart of an image decoding method according to an exemplary embodiment.

FIG. 12 is a flowchart of an image decoding method according to an exemplary embodiment.

Referring to FIG. 12, in operation 1210, the image decoding apparatus 800 or 900 illustrated in FIG. 8 or 9 decodes information that indicates an encoding mode of a current block, which is included in a bitstream. The image decoding apparatus 800 or 900 decodes information that indicates whether the current block is encoded in a skip mode, a natural mode, or a graphic mode, by parsing the bitstream.

In operation 1220, the image decoding apparatus 800 or 900 decodes the current block based on the information decoded in operation 1210. If the decoded information indicates that the current block is encoded in the skip mode, the image decoding apparatus 800 or 900 restores the current block based on a block that is identical or similar to the current block, i.e., a neighboring block decoded prior to the current block. If the decoded information indicates that the current block is encoded in the natural mode or the graphic mode, the image decoding apparatus 800 or 900 restores the current block, by inversely performing the encoding operations described above in relation to FIGS. 5 and 6A.

Figure 13:
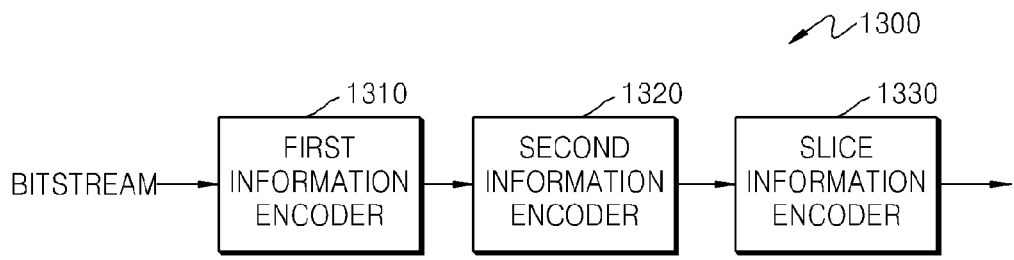
FIG. 13 is a block diagram of a mode information encoding apparatus according to an exemplary embodiment.

FIG. 13 is a block diagram of a mode information encoding apparatus 1300 according to an exemplary embodiment. The mode information encoding apparatus 1300 corresponds to the mode information encoder 440 of FIG. 4 and the mode information encoder 750 of FIG. 7.

Referring to FIG. 13, the mode information encoding apparatus 1300 includes a first information encoder 1310, a second information encoder 1320, and a slice information encoder 1330.

The first information encoder 1310 encodes first information, e.g., flag information, indicating whether a current block is encoded in a skip mode. For example, if the current block is encoded in the skip mode, based on determination of an encoding mode by the mode determination unit 110, 410 or 740, and the skip mode determination unit 710, the flag information may be set to a value of '1'. If the current block is not encoded in the skip mode, the flag information may be set to a value of '0'.

According to another exemplary embodiment, the first information encoder 1310 may selectively encode the first information, based on whether a current slice includes a block that is encoded in the skip mode. If the current slice does not include the block that is encoded in the skip mode, information indicating that the skip mode has a single value with respect to all blocks of the current slice is encoded. In other words, the flag information indicating whether a block is encoded in the skip mode has a single value '0' with respect to the all blocks of the current slice is encoded. Thus, if the current slice does not include the block that is encoded in the skip mode, the first information does not have to be encoded with respect to each block. Thus, only when the current slice includes the block that is encoded in the skip mode, does the first information encoder 1310 encode the first information with respect to each block.

According to another exemplary embodiment, even when the current slice includes the block that is encoded in the skip mode, if the current slice does not include a block that is encoded in a natural mode or a graphic mode, it is obvious that the current block is encoded in the skip mode. Thus, even when the current slice includes the block that is encoded in the skip mode, only if the current slice includes the block that is encoded in the natural mode or the graphic mode, may the first information be encoded.

When it is determined that the current block is not encoded in the skip mode, the second information encoder 1320 encodes second information indicating an encoding mode of the current block, from among the natural mode and the graphic mode. The second information is information representing the natural mode and the graphic mode, e.g., flag information for specifying an encoding mode of the current block, from among the natural mode and the graphic mode.

For example, if the current block is encoded in the natural mode, the flag information may be set as a value '0'. If the current block is encoded in the graphic mode, the flag information may be set as a value '1'. If the current block is encoded in the skip mode, since the first information encoder 1310 has encoded information representing the skip mode already, the second information encoder 1320 does not have to encode information representing the natural mode and the graphic mode.

Based on whether the current block is encoded in the skip mode, information indicating an encoding mode of the current block from among a second mode (e.g., the natural mode) and a third mode (e.g., the graphic mode) is selectively encoded, and thus the number of bits required to encode information representing modes may be reduced.

For example, if the current block is encoded in the skip mode, the information representing that the current block is encoded in the skip mode may be encoded using one bit of a value '1'. If the current block is encoded in the natural mode, the information representing that the current block is encoded in the natural mode may be encoded using two bits of a value '00'. In addition, if the current block is encoded in the graphic mode, the information representing that the current block is encoded in the graphic mode may be encoded using two bits of a value '01'. A value '0' of a first bit of the information representing the natural mode and the graphic mode is the first information representing that the current block is not encoded in the skip mode. The value '0' or '1' of a second bit of the information representing the natural mode or the graphic mode corresponds to the second information representing an encoding mode of the current block from among the natural mode and the graphic mode.

In addition, the second information encoder 1320 may selectively encode the second information, based on whether the current slice includes both a block that is encoded in the natural mode and a block that is encoded in the graphic mode.

Only when the first information encoder 1310 determines that the current block is not encoded in the skip mode, does the second information encoder 1320 encode the second information. Thus, the current block is encoded in the natural mode or the graphic mode.

However, if the current slice includes only the block that is encoded in the natural mode, it is obvious that the current block is encoded in the natural mode. Thus, although the second information is not encoded, a decoder may recognize that the current block is encoded in the natural mode, which is the same as in the case where the current slice includes only the block that is encoded in the graphic mode. Although the second information encoder 1320 does not encode the second information, the decoder may recognize that the current block is encoded in the graphic mode.

However, if the current slide includes both the block that is encoded in the natural mode and the block that is encoded in the graphic mode, since the decoder side may not recognize an encoding mode of the current block, from among the natural mode and the graphic mode, the second information encoder 1320 encodes the second information for specifying the encoding mode of the current block, from among the natural mode and the graphic mode.

The slice information encoder 1330 encodes third information indicating whether the current slice includes the block that is encoded in the skip mode, and fourth information indicating whether the current slice includes the block that is encoded in the natural mode and the block that is encoded in the graphic mode. The fourth information may include flag information indicating whether the current slice includes the block that is encoded in the natural mode, and flag information indicating whether the current slice includes the block that is encoded in the graphic mode. As described above, the first information encoder 1310 and the second information encoder 1320 may selectively encode the first information and the second information, based on whether the current slice includes the block that is encoded in the skip mode, whether the current slice includes the block that is encoded in the natural mode, and whether the current slice includes the block that is encoded in the graphic mode. Thus, the slice information encoder 1330 may allow the decoder side to selectively decode the first information and the second information based on the third information and the fourth information, without encoding the first information and the second information.

Figure 14:
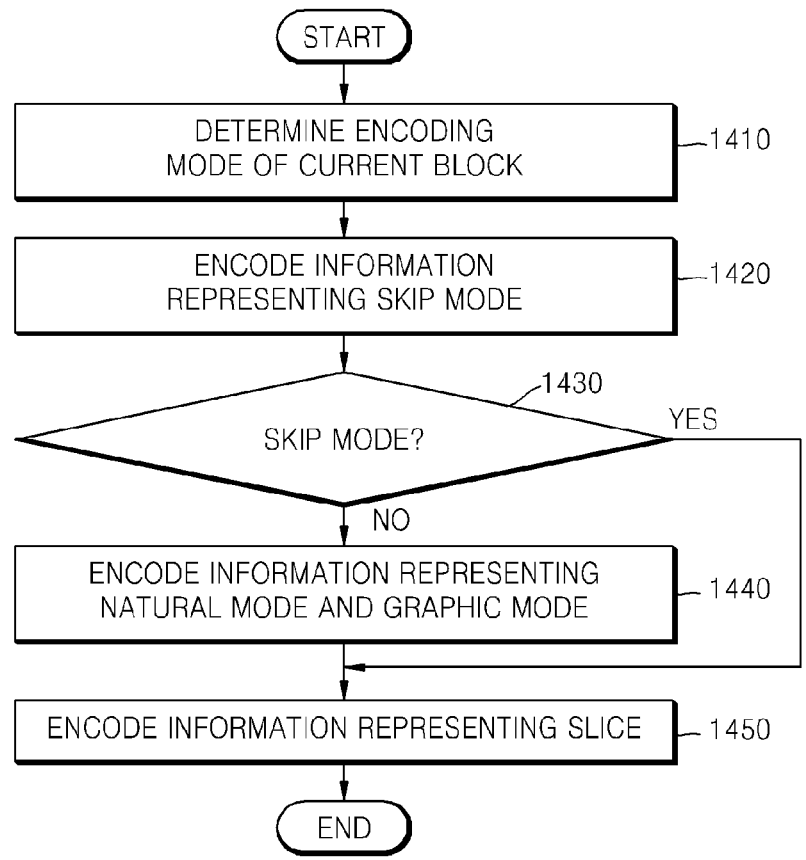
FIG. 14 is a flowchart of a method of encoding mode information, according to an exemplary embodiment.

FIG. 14 is a flowchart of a method of encoding mode information, according to an exemplary embodiment.

Referring to FIG. 14, in operation 1410, the mode information encoding apparatus 1300 determines an encoding mode of a current block. The encoding mode of the current block is determined by the mode determination unit 110, 410 or 740, and the skip mode determination unit 710.

In operation 1420, the mode information encoding apparatus 1300 encodes information indicating a skip mode, that is, first information indicating whether the current block is encoded in the skip mode. If the current block is encoded in the skip mode, flag information may be set as a value '1'. If the current block is not encoded in the skip mode, the flag information may be set as a value '0'.

In operation 1430, the mode information encoding apparatus 1300 determines whether the current block is encoded in the skip mode. If the current block is encoded in the skip mode, third information indicating that a current slice includes a block that is encoded in the skip mode is encoded, in operation 1450. The flag information indicating whether the current slice includes the block that is encoded in the skip mode may be set as a value '1'.

If the current block is not encoded in the skip mode, second information indicating an encoding mode of the current block from among the natural mode and the graphic mode is encoded, in operation 1440. If the current block is encoded in the natural mode, the flag information may be set as a value '0'. If the current block is encoded in the graphic mode, the flag information may be set as a value '1'.

In operation 1440, after the second information is encoded, fourth information indicating that the current slice includes a block that is encoded in the natural mode and a block that is encoded in the graphic mode is encoded, in operation 1450. That is, flag information indicating whether the current slice includes the block that is encoded in the natural mode, and the flag information indicating whether the current slice includes the bock that is encoded in the graphic mode are encoded.

Figure 15:
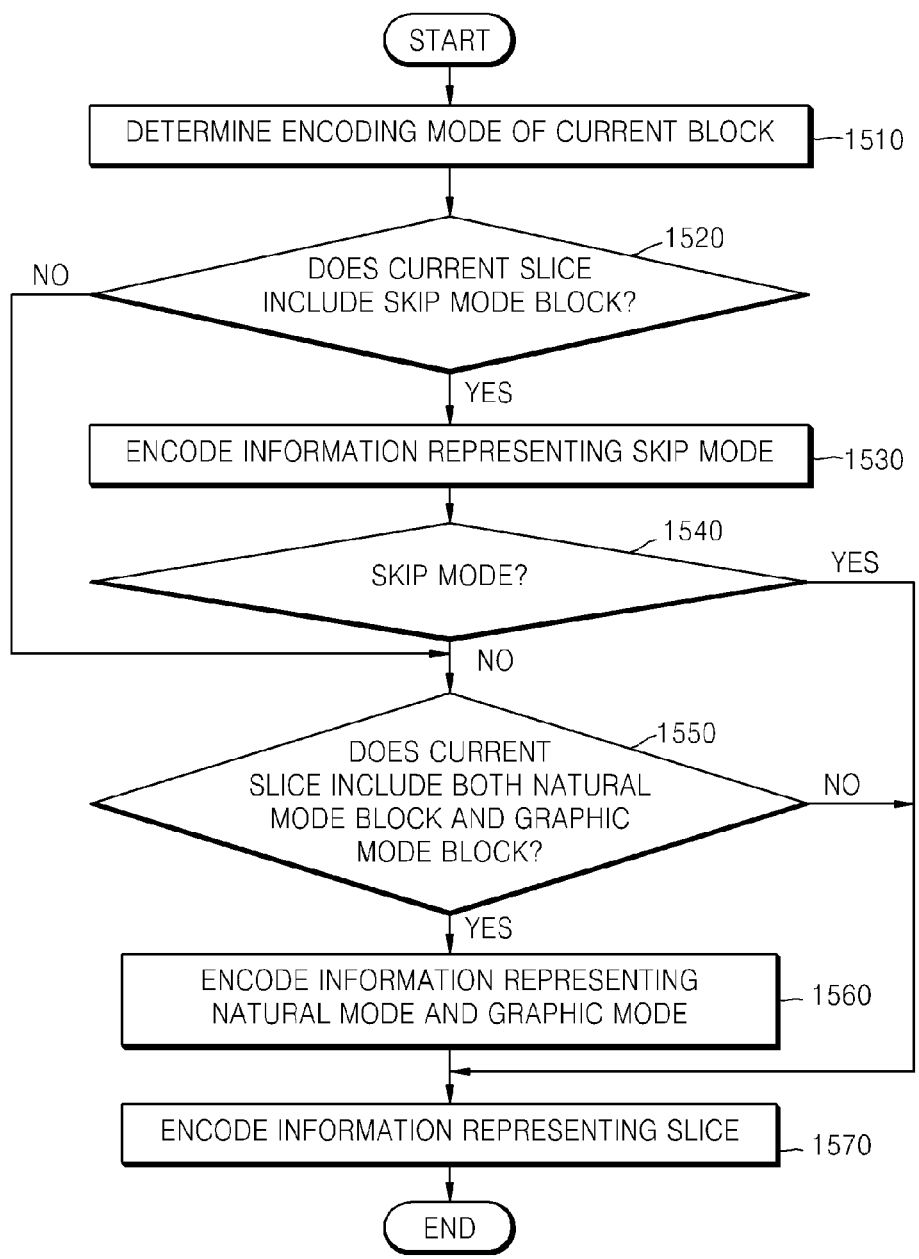
FIG. 15 is a flowchart of a method of encoding mode information, according to an exemplary embodiment.

FIG. 15 is a flowchart of a method of encoding mode information, according to another exemplary embodiment.

Referring to FIG. 15, in operation 1510, the mode information encoding apparatus 1300 determines an encoding mode of a current block, which corresponds to operation 1410 of FIG. 14.

In operation 1520, the mode information encoding apparatus 1300 determines whether a current slice includes a block that is encoded in a skip mode. If the current slice does not include the block that is encoded in the skip mode, first information indicating whether the current block is encoded in the skip mode does not have to be encoded.

In operation 1520, if it is determined that the current slice includes the block that is encoded in the skip mode, the mode information encoding apparatus 1300 encodes the first information indicating whether the current block is encoded in the skip mode, in operation 1530. If the current block is encoded in the skip mode, flag information may be set as a value '1'. If the current block is not encoded in the skip mode, the flag information may be set as a value '0'.

In operation 1540, the mode information encoding apparatus 1300 determines whether the current block is encoded in the skip mode. If the current block is encoded in the skip mode, since information indicating whether the current block is encoded in the natural mode or the graphic mode does not have to be encoded, the method may proceed to operation 1570.

In operation 1550, the mode information encoding apparatus 1300 determines whether the current slice includes both the block that is encoded in the natural mode and the block that is encoded in the graphic mode. If the current slice includes only the block that is encoded in the natural mode, since it is obvious that the current block is encoded in the natural mode, second information indicating an encoding mode of the current block from among the natural mode and the graphic mode does not have to be encoded, and thus the method proceeds to operation 1570. In addition, if the current slice includes only the block that is encoded in the graphic mode, since it is obvious that the current block is encoded in the graphic mode, the second information does not have to be encoded, and thus the method proceeds to operation 1570.

In operation 1560, the mode information encoding apparatus 1300 encodes the second information indicating an encoding mode of the current block from among the natural mode and the graphic mode. If the current mode is encoded in the natural mode, flag information may be set as a value '0'. If the current mode is encoded in the graphic mode, the flag information may be set as a value '1'.

In operation 1570, the mode information encoding apparatus 1300 encodes third information indicating that the current slice includes the block that is encoded in the skip mode, and fourth information indicating that the current slice includes the block that is encoded in the natural mode and the block that is encoded in the graphic mode. The fourth information may include flag information indicating whether the current slice includes the block that is encoded in the natural mode, and flag information indicating whether the current slice includes the block that is encoded in the graphic mode.

Figure 16:
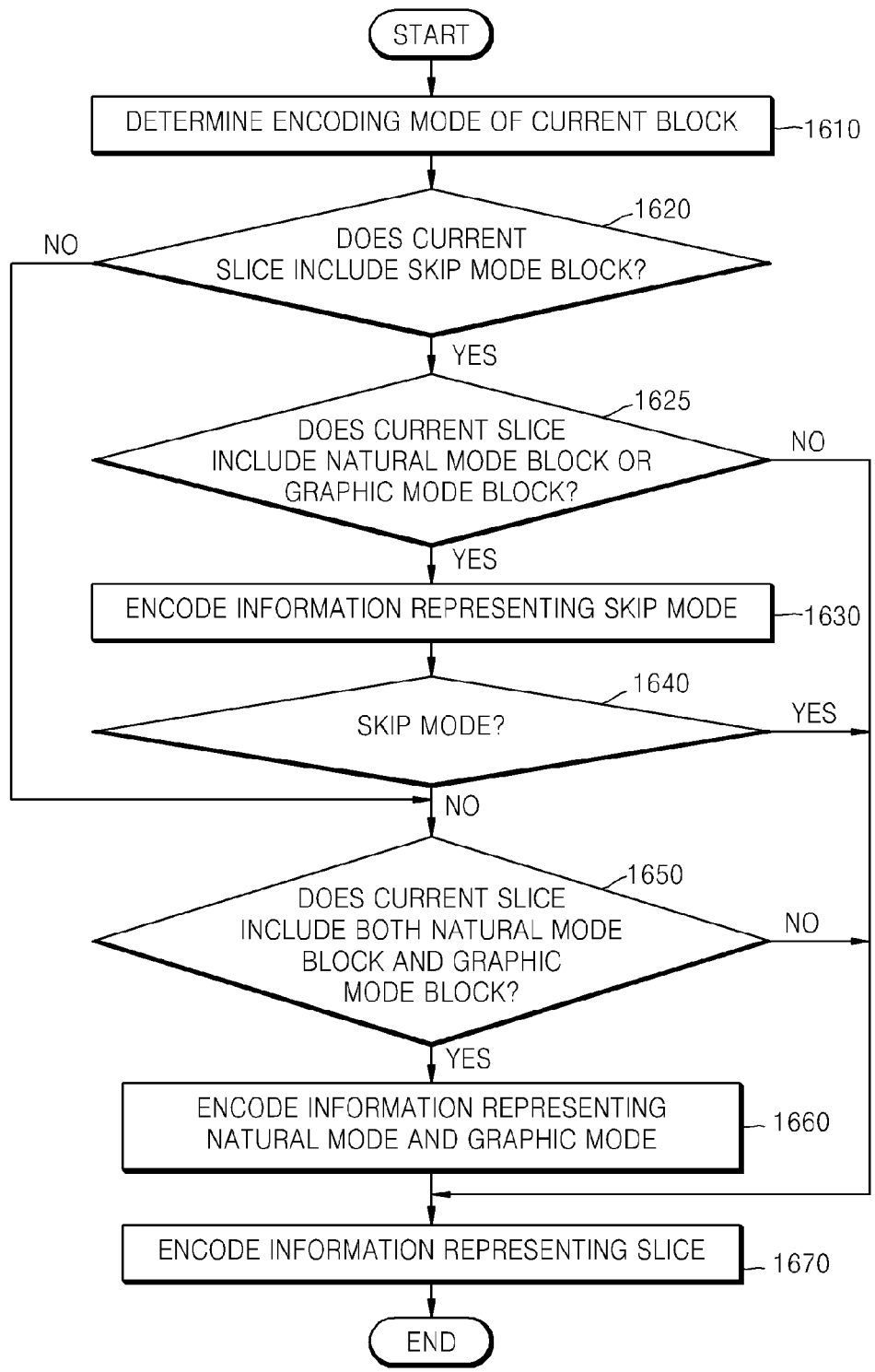
FIG. 16 is a flowchart of a method of encoding mode information, according to an exemplary embodiment.

FIG. 16 is a flowchart of a method of encoding mode information, according to another exemplary embodiment.

The method of FIG. 16 is different from the method of FIG. 15 in that the method of FIG. 16 further includes operation 1625. All other operations 1610 through 1670 respectively correspond to operations 1510 through 1570 of FIG. 15. Referring back to FIG. 15, even when the current slice includes only the block that is encoded in the skip mode, the first information is encoded. However, in the method of FIG. 16, in operation 1625, if the current slice includes only the block that is encoded in the skip mode, the method proceeds to operations 1670, and the first information is not encoded.

Mode information encoded using the method of FIG. 16 is shown in Table 1.

TABLE 1

| Skip_mode_used | Nat_mode_used | Graphic_mode_used | First information | Second information |
|---|---|---|---|---|
| 0 | 0 | 1 | Not encoded | Not encoded |
| 0 | 1 | 0 | Not encoded | Not encoded |
| 0 | 1 | 1 | Not encoded | 0<br>1 |
| 1 | 0 | 0 | Not encoded | Not encoded |
| 1 | 0 | 1 | 0<br>0<br>1 | Not encoded |
| 1 | 1 | 0 | 0<br>1 | Not encoded |
| 1 | 1 | 1 | 0<br>1 | 0<br>1<br>Not encoded |

The 'skip_mode_used' field corresponds to flag information indicating whether the current slice includes the block that is encoded in the skip mode, and corresponds to the third information. The 'nat_mode_used' field corresponds to flag information indicating whether the current slice includes the block that is encoded in the natural mode. The 'graphic_mode_used' field corresponds to flag information indicating whether the current slice includes the block that is encoded in the graphic mode. The 'nat_mode_used' and the 'graphic_mode_used' fields correspond to the above-described fourth information. The first information is flag information indicating whether the current block include the block that is encoded in the skip mode, and the second information is flag information indicating an encoding mode of the current block from among the natural mode and the graphic mode.

Figure 17:
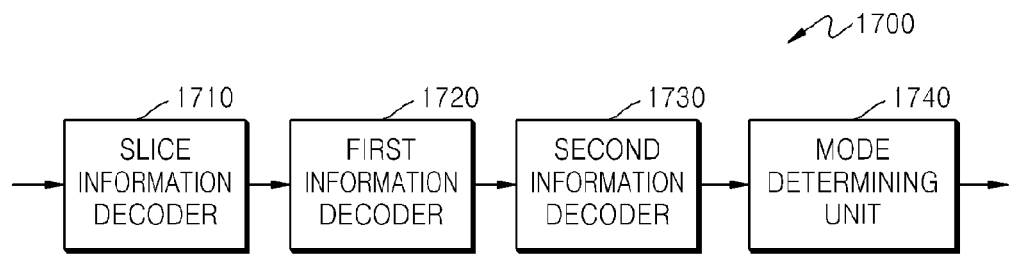
FIG. 17 is a block diagram of a mode information decoding apparatus, according to an exemplary embodiment.

FIG. 17 is a block diagram of a mode information decoding apparatus 1700, according to an exemplary embodiment.

The mode information decoding apparatus 1700 of FIG. 17 corresponds to the mode information decoder 810 of FIG. 8, or the mode information decoder 910 of FIG. 9.

Referring to FIG. 17, the mode information decoding apparatus 1700 includes a slice information decoder 1710, a first information decoder 1720, a second information decoder 1730, and a mode determining unit 1740.

The slice information decoder 1710 parses third information indicating whether a current slice includes a block that is encoded in a skip mode, and fourth information indicating whether the current slice includes a block that is encoded in a natural mode and a block that is encoded in a graphic mode, which are included in a bitstream. The fourth information may include flag information indicating whether the current slice includes the block that is encoded in the natural mode, and flag information indicating whether the current slice includes the block that is encoded in the graphic mode.

The first information decoder 1720 parses first information indicating whether a current block is encoded in the skip mode. The first information may be flag information indicating whether the current block is encoded in the skip mode. If the current block is encoded in the skip mode, flag information may be a value '1'. If the current block is not encoded in the skip mode, the flag information may be a value '0'.

According to another exemplary embodiment, the first information decoder 1720 may selectively parse the first information, based on whether the current slice includes the block that is encoded in the skip mode. If the current slice does not include the block that is encoded in the skip mode, it is obvious that all blocks of the current slice are not encoded in the skip mode, and the mode information encoding apparatus 1300 does not encode the first information. If the current slice does not include the block that is encoded in the skip mode, the first information does not have to be parsed, with respect to each block. Thus, only when the current slice includes the block that is encoded in the skip mode, does the first information decoder 1720 parses the first information, with respect to each block.

According to another exemplary embodiment, if the current slice includes the block that is encoded in the skip mode, only when the current slice includes the block that is encoded in the natural mode, or the block that is included in the graphic mode, does the mode information encoding apparatus 1300 encode the first information. Only when the current slice includes the block that is encoded in the natural mode, or the block that is encoded in the graphic mode, may the first information decoder 1720 parse the first information, based on the fourth information decoded by the slice information decoder 1710.

When it is determined that the current block is not encoded in the skip mode, the second information decoder 1730 parses second information indicating an encoding mode of the current block from among the natural mode and the graphic mode. The second information may be flag information for specifying an encoding mode of the current block from among the natural mode and the graphic mode. If the current block is encoded in the skip mode, since the first information decoder 1720 has parsed information indicating the skip mode already, and has determined a decoding mode to be used to decode the current block as the skip mode, already, information indicating the natural mode and the graphic mode does not have to be parsed.

In addition, the second information decoder 1730 may selectively decode the second information, based on the fourth information that is decoded by the slice information decoder 1710. If the current slice includes only the block that is encoded in the natural mode, since it is obvious that the current block is encoded in the natural mode, and the mode information encoding apparatus 1300 does not encode the second information, the second information decoder 1730 does not have to parse the second information. If the current slice includes only the block that is encoded in the graphic mode, since it is obvious that the current block is encoded in the graphic mode, and the mode information encoding apparatus 1300 does not encode the second information, the second information decoder 1730 does not have to parse the second information.

In short, the second information decoder 1730 parses the second information only when it is determined that the current slice includes both the block that is encoded in the natural mode and the block that is encoded in the graphic mode, based on the fourth information.

The mode determining unit 1740 determines the decoding mode of the current block, based on at least one of the first information decoded by the first information decoder 1720, and the second information decoded by the second information decoder 1730. Initially, the mode determining unit 1740 determines whether the decoding mode of the current block is the skip mode, based on the first information. Then, if the decoding mode of the current block is not the skip mode, the mode determining unit 1740 determines the decoding mode of the current block from among the natural mode or the graphic mode.

Figure 18:
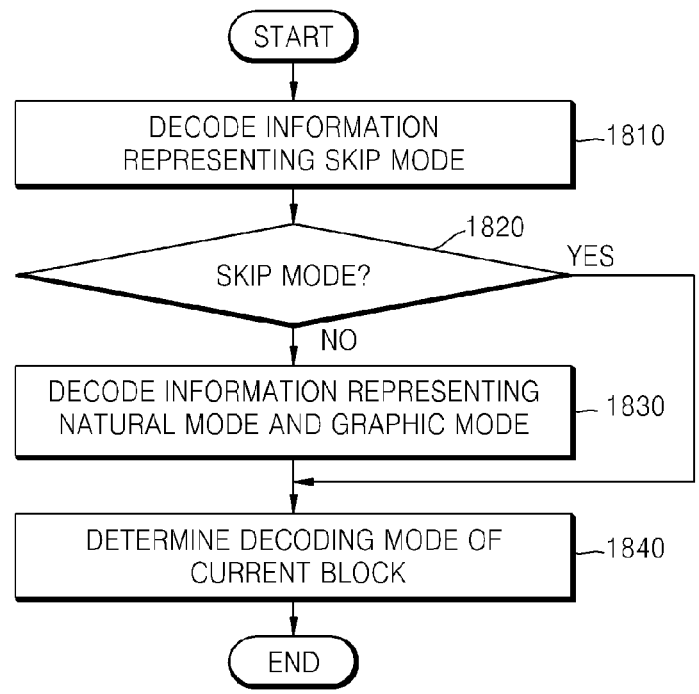
FIG. 18 is a flowchart of a method of decoding mode information, according to an exemplary embodiment.

FIG. 18 is a flowchart of a method of decoding mode information, according to an exemplary embodiment.

Referring to FIG. 18, in operation 1810, the mode information decoding apparatus 1700 decodes first information indicating that a current block is encoded in a skip mode. The mode information decoding apparatus 1700 parses the first information included in a bitstream.

In operation 1820, the mode information decoding apparatus 1700 determines whether the current block is encoded in the skip mode, based on the first information decoded in operation 1810. If the current block is encoded in the skip mode, the method proceeds to operation 1840, and a decoding mode of the current block is determined as the skip mode.

In operation 1820, if it is determined that the current block is not encoded in the skip mode, the mode information decoding apparatus 1700 decodes second information indicating an encoding mode of the current mode from among a natural mode and a graphic mode, in operation 1830, and parses the second information included in a bitstream. Then, based on the decoded second information, the decoding mode of the current block is determined as the natural mode or the graphic mode, in operation 1840.

Figure 19:
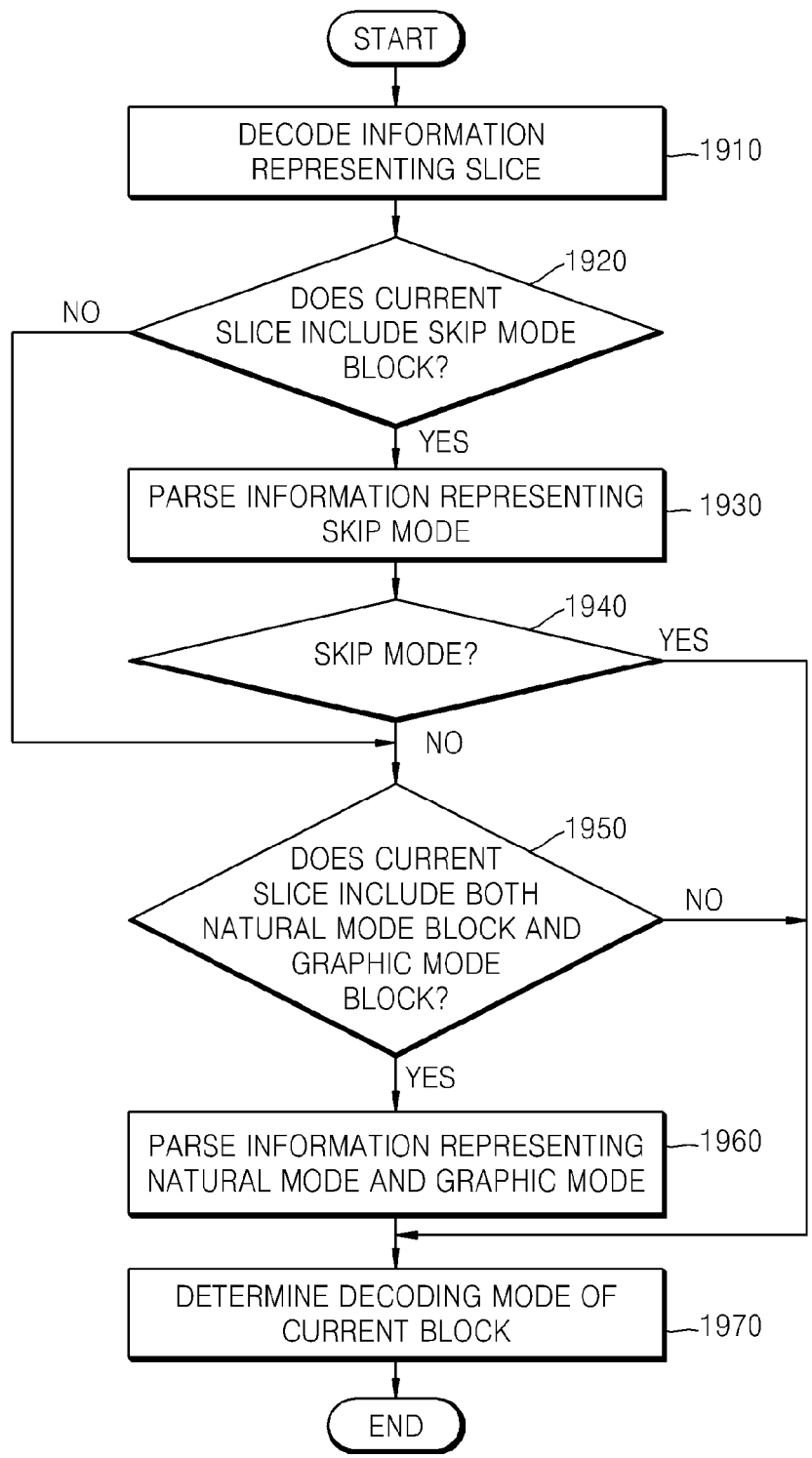
FIG. 19 is a flowchart of a method of decoding mode information, according to an exemplary embodiment.

FIG. 19 is a flowchart of a method of decoding mode information, according to another exemplary embodiment.

Referring to FIG. 19, in operation 1910, the mode information decoding apparatus 1700 decodes third information indicating whether a current slice includes a block that is encoded in a skip mode, and fourth information indicating whether the current slice includes a block that is encoded in a natural mode and a block that is encoded in a graphic mode. The mode information decoding apparatus 1700 parses the third information and the fourth information included in a bitstream.

In operation 1920, the mode information decoding apparatus 1700 determines whether the current slice includes the block that is encoded in the skip mode. It is determined whether the current slice includes the block that is encoded in the skip mode, based on the third information decoded in operation 1910. If the current block does not include the block that is encoded in the skip mode, first information indicating whether the current block is encoded in the skip mode does not have to be parsed.

In operation 1920, when it is determined that the current slice includes the block that is encoded in the skip mode, the mode information decoding apparatus 1700 parses the first information indicating whether the current block is encoded in the skip mode, in operation 1930.

In operation 1940, the mode information decoding apparatus 1700 determines whether the current block is encoded in the skip mode. It is determined whether the current block is encoded in the skip mode, based on the first information parsed in operation 1930. If the current block is encoded in the skip mode, since information indicating an encoding mode of the current block from among the natural mode and the graphic mode does not have to be parsed, the method proceeds to operation 1970.

In operation 1950, the mode information decoding apparatus 1700 determines whether the current slice includes both the block that is encoded in the natural mode and the block that is encoded in the graphic mode, based on the fourth information decoded in operation 1910. If the current slice includes only the block that is encoded in the natural mode, since it is obvious that the current block is encoded in the natural mode, and second information indicating an encoding mode of the current block from among the natural mode and the graphic mode does not have to be parsed, the method proceeds to operation 1970. In addition, if the current slice includes only the block that is encoded in the graphic mode, since it is obvious that the current block is encoded in the graphic mode, and the second information does not have to be parsed, the method proceeds to operation 1970.

In operation 1960, the mode information decoding apparatus 1700 parses the second information indicating the encoding mode of the current block from among the natural mode and the graphic mode.

In operation 1970, the decoding mode of the current block is determined based on at least one of the first information and the second information, which are parsed in operations 1930 and 1960.

Figure 20:
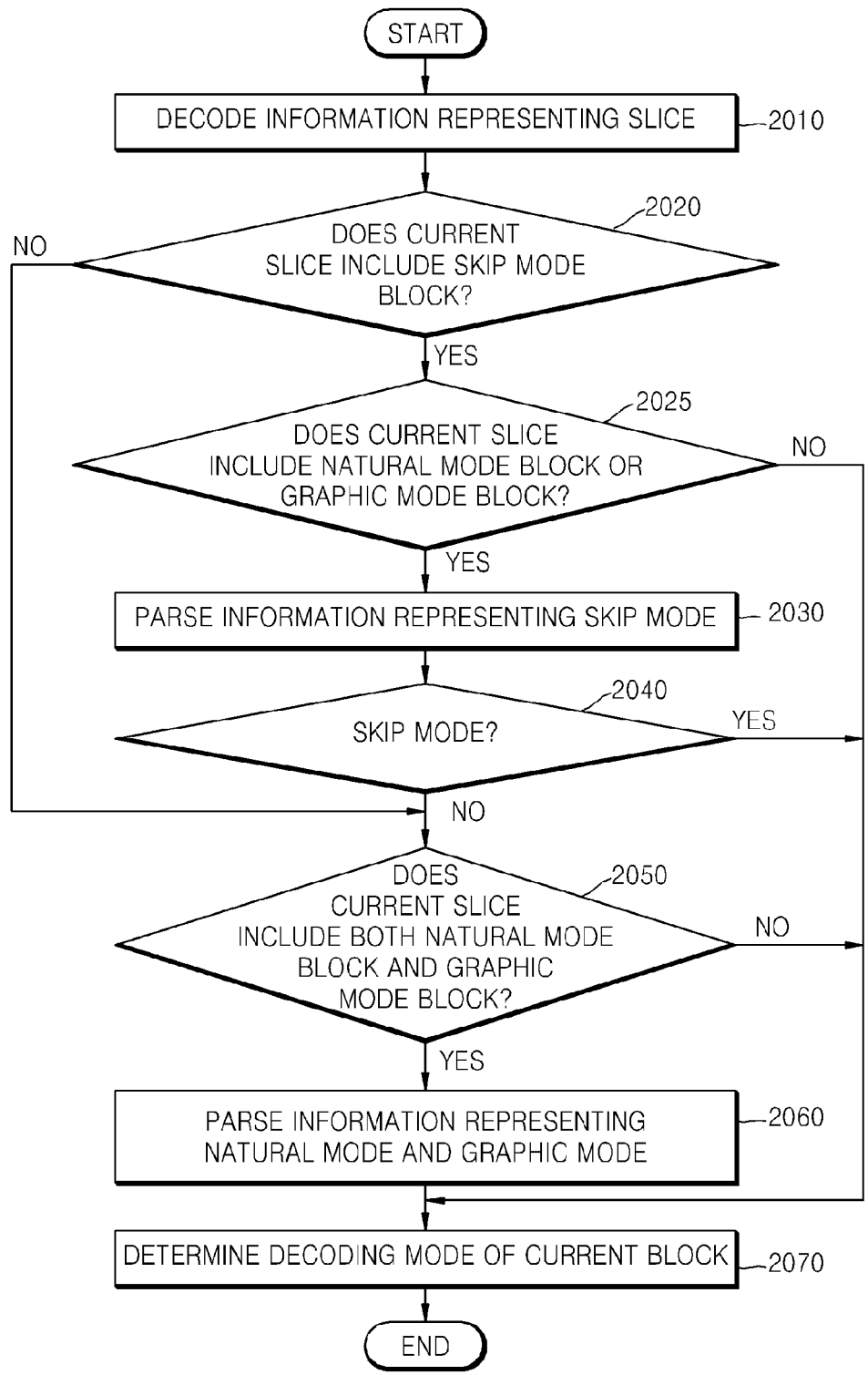
FIG. 20 is a flowchart of a method of decoding mode information, according to an exemplary embodiment.

FIG. 20 is a flowchart of a method of decoding mode information, according to another exemplary embodiment. The method of FIG. 20 corresponds to the method of encoding mode information of FIG. 16.

The method of FIG. 20 is different from the method of FIG. 19 in that the method of FIG. 20 further includes operation 2025. All other operations 2010 through 2070 respectively correspond to operations 1910 through 1970 of FIG. 19. Referring to FIG. 19, even when the current slice includes only the block that is encoded in the skip mode, the first information is parsed. However, in the method of FIG. 20, in operation 2025, if the current slice includes the block that is encoded in the skip mode, the method proceeds to operation 2070, and the first information is not parsed.

According to the one or more exemplary embodiments, mode information may be efficiently encoded by hierarchically encoding information regarding an encoding mode of an image block.

While exemplary embodiments have been particularly shown and described, it will be understood by one of ordinary skill in the art that various changes in form and details may be made therein without departing from the spirit and scope of the invention as defined by the following claims and their equivalents. The exemplary embodiments can also be embodied as computer readable codes on a computer readable recording medium. The computer readable recording medium is any data storage device that can store data, which can be thereafter read by a computer system to execute the computer readable codes stored thereon.

The image encoding or decoding apparatuses illustrated in FIG. 1, 4, 7, 8, or 9 may include a bus coupled to every unit of the apparatus, at least one processor connected to the bus, and memory connected to the bus to store commands, received messages, and generated messages, and the processor executes the commands and controls the operations of the apparatuses.

Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. In an alternative embodiment, the exemplary embodiments can also be embodied as computer readable transmission media, such as carrier waves, for transmission over a network.

What is claimed is:

1. A method of decoding mode information of a current block of an image, the method comprising:
  decoding first information that indicates whether the current block is encoded in a first encoding mode, from a bitstream;
  in response to decoding first information indicating the current block is not encoded in the first encoding mode, decoding second information that indicates an encoding mode of the current block from among a second encoding mode and a third encoding mode; and
  determining a decoding mode to be used to decode the current block, based on at least one of the decoded first information and the decoded second information,
  wherein the first encoding mode indicates that the current block is identical to a second block that is encoded prior to the current block, the current block adjacent to the second block in a slice of the image.

2. The method of claim 1, wherein the second encoding mode is an encoding mode that encodes the current block based on discrete cosine transformation (DCT), and
  wherein the third encoding mode is an encoding mode that encodes the current block based on a plurality of bit planes of pixel values.

3. The method of claim 1, wherein the decoding of the first information comprises: selectively parsing the first information, based on third information that indicates whether the slice includes a block that is encoded in the first encoding mode.

4. The method of claim 3, wherein the selective parsing of the first information comprises:
  determining whether the slice includes the block that is encoded in the first encoding mode, based on the third information; and in response to determining that the slice includes the block that is encoded in the first encoding mode, based on the third information, parsing the first information.

5. The method of claim 3, wherein the selective parsing of the first information comprises:
   determining whether the slice includes the block that is encoded in the first encoding mode, based on the third information, and determining whether the slice includes a block that is encoded in the second encoding mode, or a block that is encoded in the third encoding mode, based on fourth information; and
   in response to determining that the slice includes the block that is encoded in the first encoding mode, and the slice includes the block that is encoded in the second encoding mode or the block that is encoded in the third encoding mode, based on the third information and the fourth information, parsing the first information.

6. The method of claim 1, wherein the decoding of the second information comprises:
   in response to determining that the current block is not encoded in the first encoding mode, based on the decoded first information, selectively parsing the second information, based on fourth information that indicates whether the slice includes both a block that is encoded in the second encoding mode and a block that is encoded in the third encoding mode.

7. The method of claim 6, wherein the selective parsing of the second information comprises:
   determining whether the slice includes both the block that is encoded in the second encoding mode and the block that is encoded in the third encoding mode, based on the fourth information; and
   in response to determining that the slice includes both the block that is encoded in the second encoding mode and the block that is encoded in the third encoding mode, based on the fourth information, parsing the second information.

8. The method of claim 2, wherein the second encoding mode is an encoding mode that performs DCT on the pixel values of the current block to generate DCT coefficients, separates the DCT coefficients into a plurality of bit planes from a bit plane of most significant bits (MSBs) to a bit plane of least significant bits (LSBs), and encodes the DCT coefficients in units of bit planes.

9. The method of claim 2, wherein the third encoding mode is an encoding mode that separates the pixel values of the current block into a plurality of bit planes from a bit plane of most significant bits (MSBs) to a bit plane of least significant bits (LSBs), and encodes the pixel values in units of bit planes.

10. A method of encoding mode information of a current block of an image, the method comprising:
    determining an encoding mode of the current block from among a first encoding mode, a second encoding mode, and a third encoding mode;
    encoding first information that indicates whether the current block is encoded in the first encoding mode; and
    in response to determining that the encoding mode of the current block is not the first encoding mode, encoding second information that indicates whether the encoding mode of the current block is one of the second encoding mode and the third encoding mode,
    wherein the first encoding mode indicates that the current block is identical to a second block that is encoded prior to the current block, the current block adjacent to the second block in a slice of the image.

11. The method of claim 10, wherein the second mode is an encoding mode that encodes the current block based on discrete cosine transformation (DCT), and
    wherein the third encoding mode is an encoding mode for the current block based on a plurality of bit planes of pixel values.

12. The method of claim 10, wherein the encoding of the first information comprises: selectively encoding the first information, based on whether the slice includes a block that is encoded in the first encoding mode.

13. The method of claim 12, wherein the selective encoding of the first information comprises:
    determining whether the slice includes the block that is encoded in the first encoding mode; and
    in response to determining that the slice includes the block that is encoded in the first encoding mode, encoding the first information.

14. The method of claim 12, wherein the selectively encoding of the first information comprises:
    determining whether the slice includes the block that is encoded in the first encoding mode and whether the slice includes a block that is encoded in the second encoding mode or a block that is encoded in the third encoding mode; and
    in response to determining that the slice includes the block that is encoded in the first encoding mode and the block that is encoded in the second encoding mode or the block that is encoded in the third encoding mode, encoding the first information.

15. The method of claim 10, wherein the encoding of the second information comprises: in response to determining that the current block is not encoded in the first encoding mode, selectively encoding the second information, based on whether the slice includes both the block that is encoded in the second encoding mode and the block that is encoded in the third encoding mode.

16. The method of claim 15, wherein the encoding of the second information comprises:
    determining whether the slice includes both the block that is encoded in the second encoding mode and the block that is encoded in the third encoding mode; and
    in response to determining that the slice includes both the block that is encoded in the second encoding mode and the block that is encoded in the third encoding mode, encoding the second information.

17. The method of claim 11, wherein the second encoding mode is an encoding mode that performs discrete cosine transformation (DCT) on the pixel values of the current block to generate DCT coefficients, separates the DCT coefficients into a plurality of bit planes from a bit plane of most significant bits (MSBs) to a bit plane of least significant bits (LSBs), and encodes the DCT coefficients in units of bit planes.

18. The method of claim 11, wherein the third mode is an encoding mode that separates the pixel values of the current block into a plurality of bit planes from a bit plane of most significant bits (MSBs) to a bit plane of least significant bits (LSBs), and encodes the pixel values in units of bit planes.

19. An apparatus for decoding mode information of a current block of an image, the apparatus comprising:
    a first information decoder that decodes first information that indicates whether the current block is encoded in a first encoding mode and determines whether the current block is encoded in the first encoding mode based on the decoded first information;

a second information decoder that, in response to the first information decoder determining that the current block is not encoded in the first encoding mode, decodes second information that indicates an encoding mode of the current block from among a second encoding mode and a third encoding mode; and a mode determination unit that determines a decoding mode to be used to decode the current block, based on at least one of the decoded first information and the decoded second information, wherein the first encoding mode indicates that the current block is identical to a second block that is encoded prior to the current block, the current block adjacent to the second block in a slice of the image.

20. An apparatus for encoding mode information of a current block of an image, the apparatus comprising:

a mode determination unit that determines an encoding mode of the current block from among a first encoding mode, a second encoding mode, and a third encoding mode;

a first information encoder that encodes first information that indicates whether the current block is encoded in the first encoding mode; and a second information encoder that, in response to the mode determination unit determining that the current block is not encoded in the first encoding mode, encoding second information that indicates whether the encoding mode of the current block is one of the second encoding mode and the third encoding mode, wherein the first encoding mode indicates that the current block is identical to a second block that is encoded prior to the current block, the current block adjacent to the second block in a slice of the image.

21. A non-transitory computer-readable recording medium having recorded thereon a computer program for executing the method of claim 1.

22. A non-transitory computer-readable recording medium having recorded thereon a computer program for executing the method of claim 10.

* * * * *